United States Patent
Fiedler et al.

(10) Patent No.: US 10,385,895 B2
(45) Date of Patent: Aug. 20, 2019

(54) HAND-ACTUATED CLOSING DEVICE WITH A DELAYING SYSTEM

(71) Applicant: Fidlock GmbH, Hannover (DE)

(72) Inventors: Joachim Fiedler, Hannover (DE); Breido Botkus, Hannover (DE); Laurentius Sommer, Hannover (DE)

(73) Assignee: Fidlock GmbH, Hannover (DE)

(*) Notice: Subject to any disclaimer, the term of this patent is extended or adjusted under 35 U.S.C. 154(b) by 356 days.

(21) Appl. No.: 15/324,002

(22) PCT Filed: Jun. 25, 2015

(86) PCT No.: PCT/EP2015/064420
§ 371 (c)(1),
(2) Date: Jan. 5, 2017

(87) PCT Pub. No.: WO2016/005203
PCT Pub. Date: Jan. 14, 2016

(65) Prior Publication Data
US 2017/0159683 A1    Jun. 8, 2017

(30) Foreign Application Priority Data
Jul. 9, 2014 (DE) .......................... 10 2014 213 383

(51) Int. Cl.
*E05C 1/10* (2006.01)
*F16B 2/18* (2006.01)
(Continued)

(52) U.S. Cl.
CPC ............ *F16B 2/185* (2013.01); *E05B 15/022* (2013.01); *E05B 17/0041* (2013.01);
(Continued)

(58) Field of Classification Search
CPC .............. Y10T 403/58; Y10T 403/581; Y10T 403/583; Y10T 403/587; Y10T 403/59;
(Continued)

(56) References Cited

U.S. PATENT DOCUMENTS 2,718,420 A   9/1955   Teetor
5,520,424 A * 5/1996   Hapke .................... D06F 37/42
                                                           292/198

(Continued)

FOREIGN PATENT DOCUMENTS

DE       1086584 B    8/1960
DE     10036945 A1    2/2002
(Continued)

*Primary Examiner* — Jonathan P Masinick
(74) *Attorney, Agent, or Firm* — The Webb Law Firm

(57) ABSTRACT

A hand-actuated closing device is provided. The closing device includes two closing parts which are fittable together along a closing direction, are mechanically interconnected in a closed position and are releasable from one another as by releasing the mechanical connection. One of the closure parts includes a housing and a locking element which is arranged so as to be movable on the housing and is in connection with the other closure part in the closed position to produce the mechanical connection between the closure parts. In the closed position, the locking part assumes a first position on the housing, is manually movable from the first position into a second position to release the closure parts and is resettable from the second position into the first position under the action of a resetting force. The closing device further includes a delaying system.

20 Claims, 23 Drawing Sheets

(51) Int. Cl.
*E05C 1/14* (2006.01)
*E05C 3/04* (2006.01)
*E05B 17/00* (2006.01)
*E05B 15/02* (2006.01)
*E05B 47/00* (2006.01)
*E05B 63/12* (2006.01)
*E05C 3/12* (2006.01)

(52) U.S. Cl.
CPC .......... *E05B 47/004* (2013.01); *E05B 63/128* (2013.01); *E05C 1/10* (2013.01); *E05C 1/14* (2013.01); *E05C 3/042* (2013.01); *E05C 3/12* (2013.01); *E05B 2015/0235* (2013.01)

(58) Field of Classification Search
CPC ............. Y10T 403/591; Y10T 403/593; Y10T 403/595; Y10T 403/60; Y10T 403/602; Y10T 403/606; Y10T 403/608; F16B 2/185; F16B 1/005; F16B 1/0057; E05B 43/00; E05B 77/42; E05B 47/004; E05C 1/08; E05C 1/085; E05C 1/10; E05C 1/14; E05C 3/12
See application file for complete search history.

(56) References Cited

U.S. PATENT DOCUMENTS

| | | | | |
|---|---|---|---|---|
| 5,636,814 A * | 6/1997 | Rollert | .................. | B64C 1/1407 192/71 |
| 5,823,582 A * | 10/1998 | Frolov | ................ | E05B 65/1053 292/92 |
| 6,390,518 B1 * | 5/2002 | Elick | ................... | A47L 15/4259 292/117 |
| 6,502,870 B1 * | 1/2003 | Luo | ..................... | E05B 47/0012 292/201 |
| 7,469,942 B2 * | 12/2008 | Whitaker | ............... | E05B 65/108 292/92 |
| 7,484,777 B2 * | 2/2009 | Condo | ................ | E05B 65/1053 292/92 |
| 7,591,157 B2 * | 9/2009 | O'Neill | .................... | E05C 9/06 292/32 |
| 7,775,567 B2 | 8/2010 | Ligtenberg et al. | | |
| 8,464,403 B2 | 6/2013 | Fiedler | | |
| 2010/0287741 A1 | 11/2010 | Fiedler | | |
| 2010/0308605 A1 | 12/2010 | Fiedler | | |
| 2011/0131770 A1 | 6/2011 | Fiedler | | |
| 2012/0248791 A1 * | 10/2012 | Chu | ......................... | E05C 1/10 292/128 |
| 2014/0193193 A1 * | 7/2014 | Wikander | ............. | G06F 1/1616 403/322.1 |
| 2015/0135486 A1 | 5/2015 | Fiedler et al. | | |

FOREIGN PATENT DOCUMENTS

| | | |
|---|---|---|
| EP | 1291260 A1 | 3/2003 |
| GB | 2461107 A | 12/2009 |
| GB | 2486813 A | 6/2012 |
| WO | 2008006354 A2 | 1/2008 |
| WO | 2008006356 A2 | 1/2008 |
| WO | 2008006357 A2 | 1/2008 |
| WO | 2009010049 A2 | 1/2009 |
| WO | 2009092368 A2 | 7/2009 |
| WO | 2009127196 A2 | 10/2009 |
| WO | 2010006594 A2 | 1/2010 |
| WO | 2014090926 A1 | 6/2014 |
| WO | 2014180512 A1 | 11/2014 |

* cited by examiner

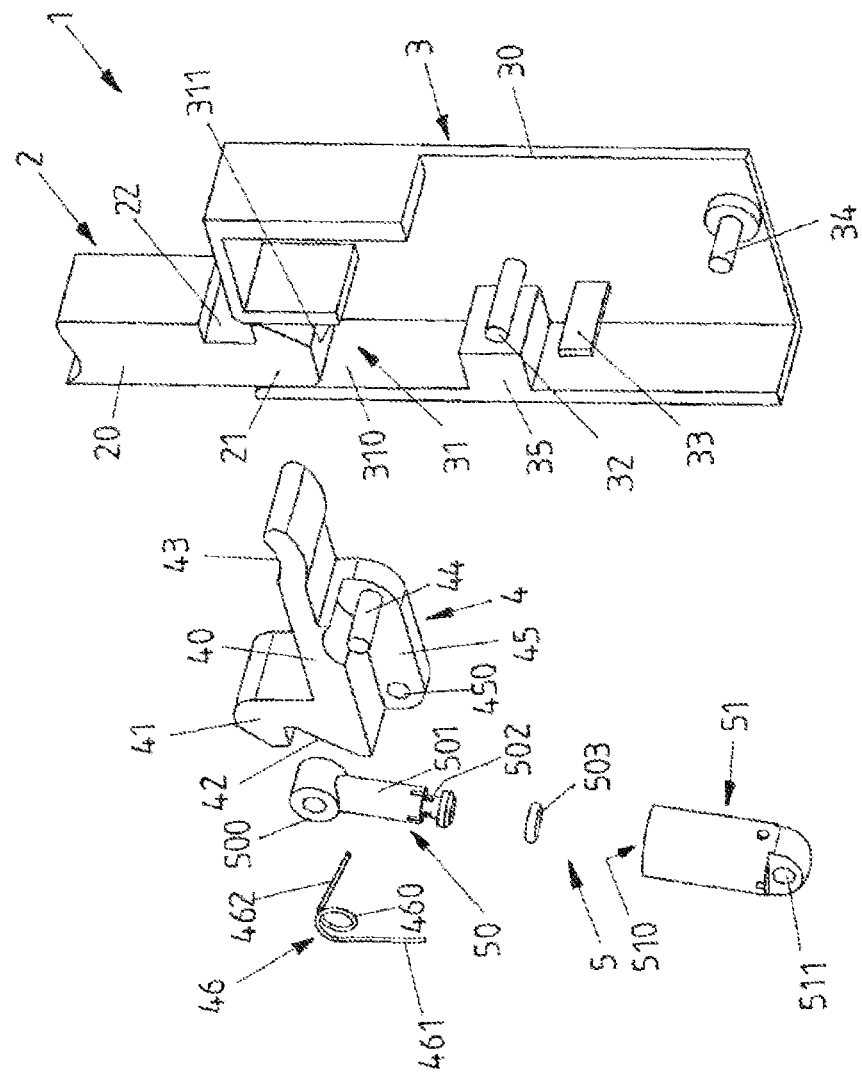

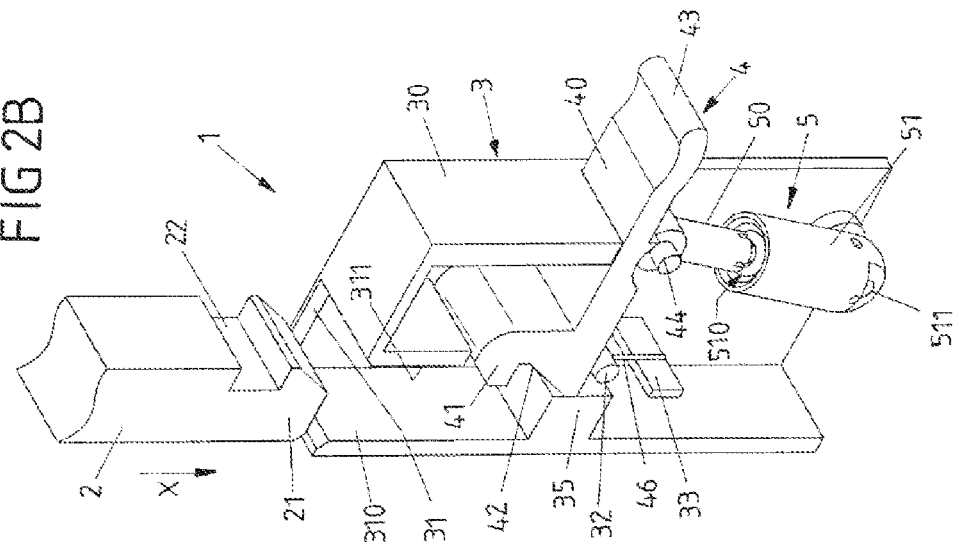
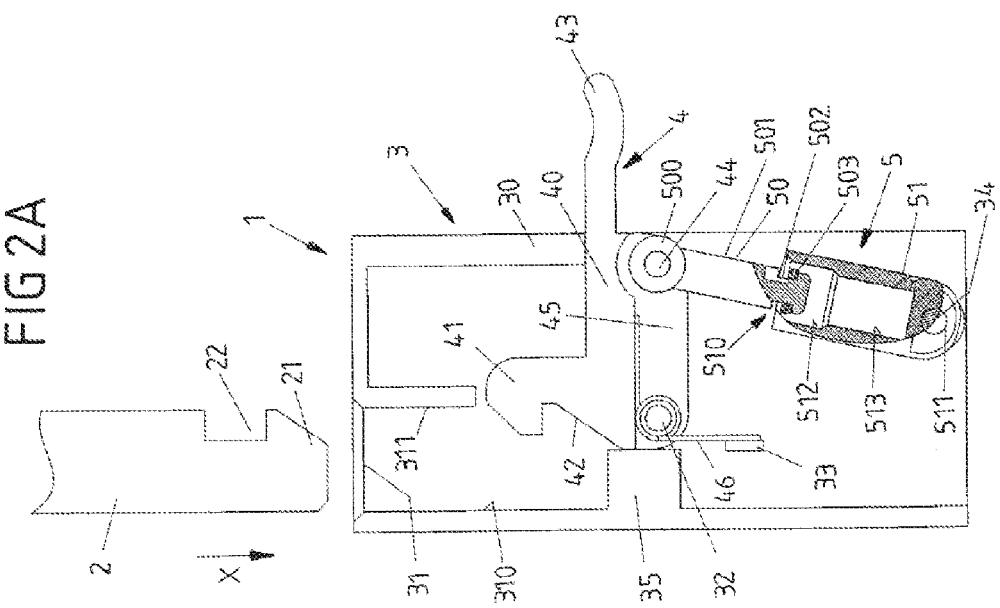

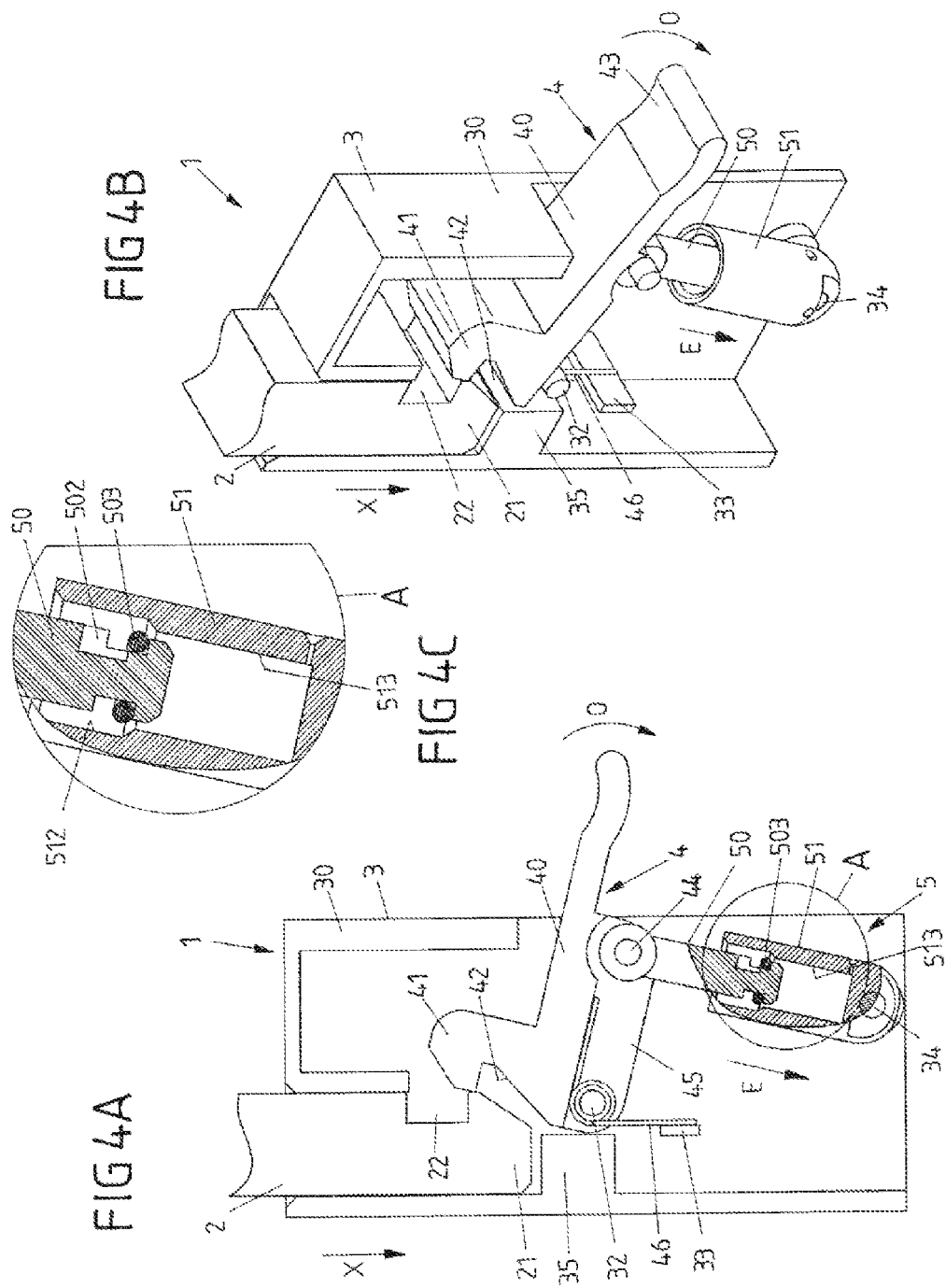

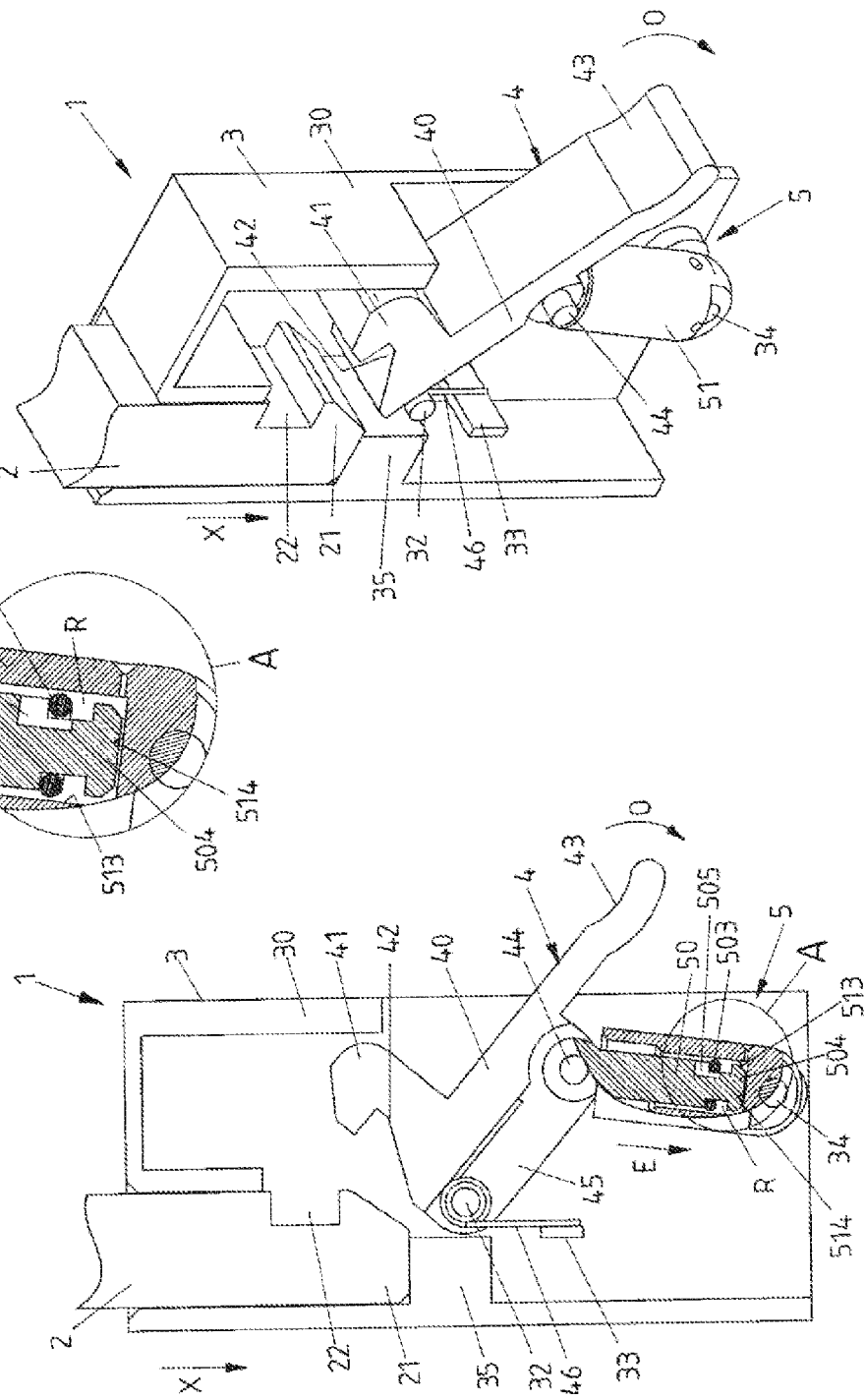

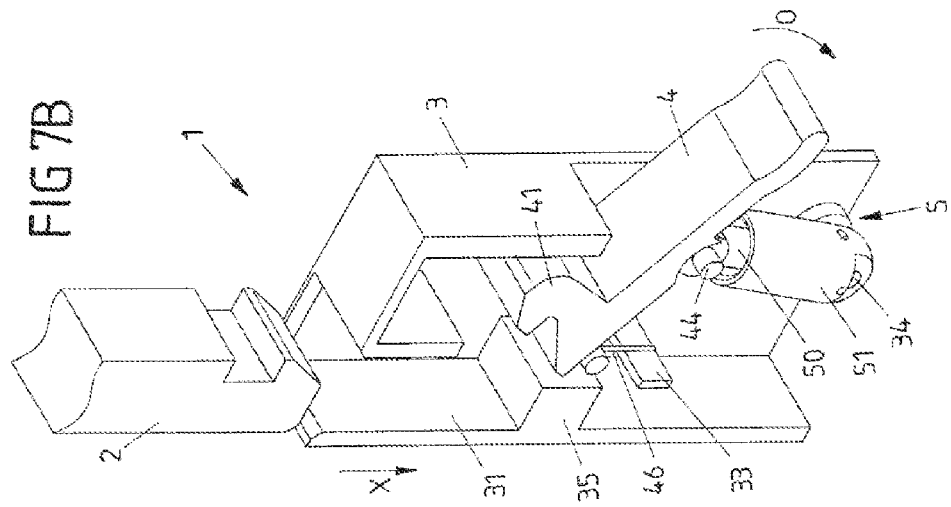
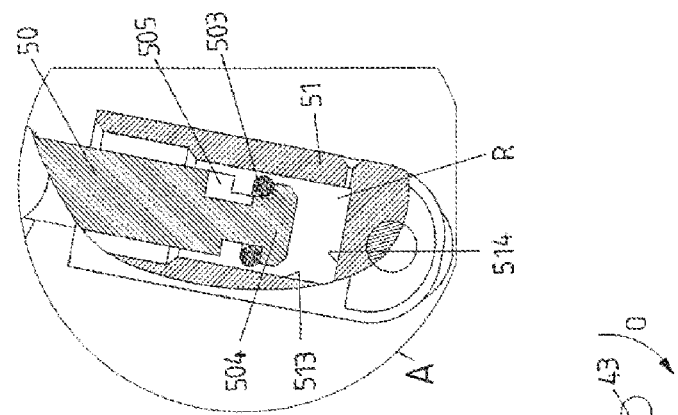
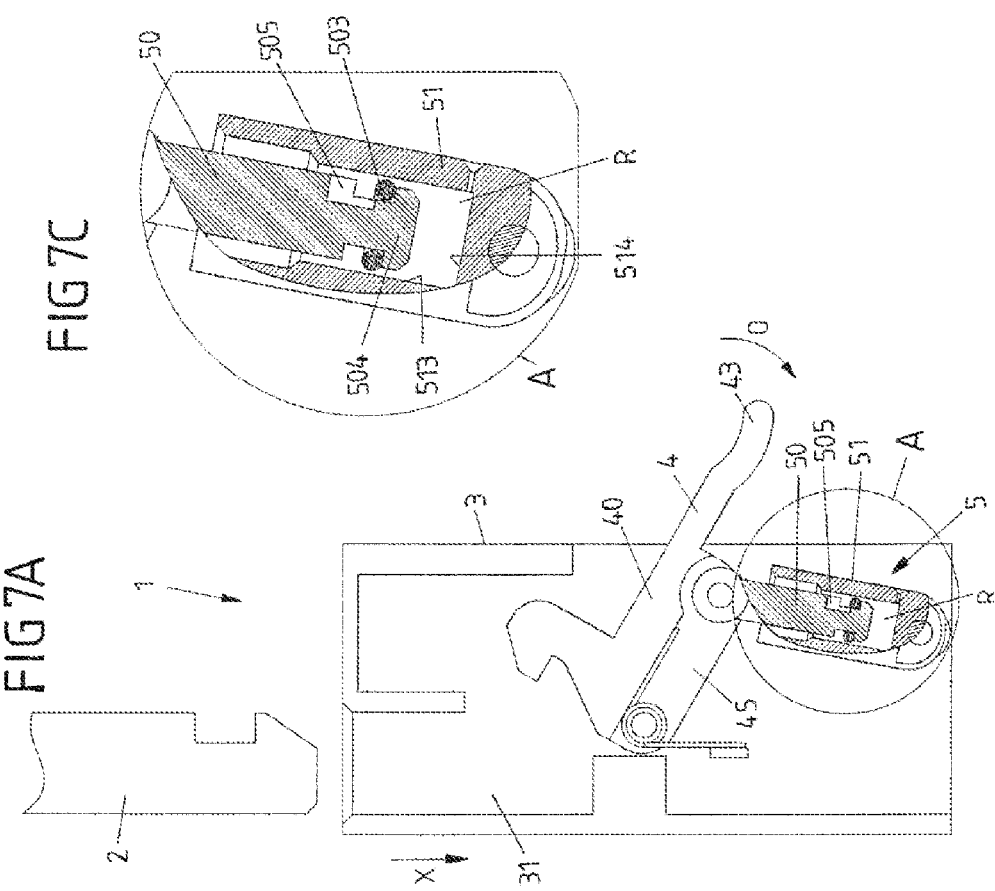

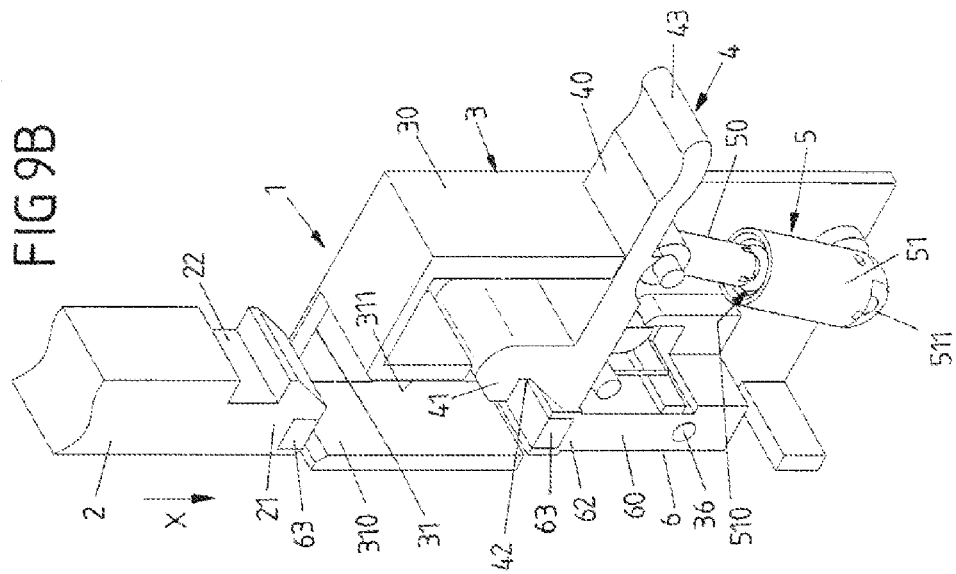
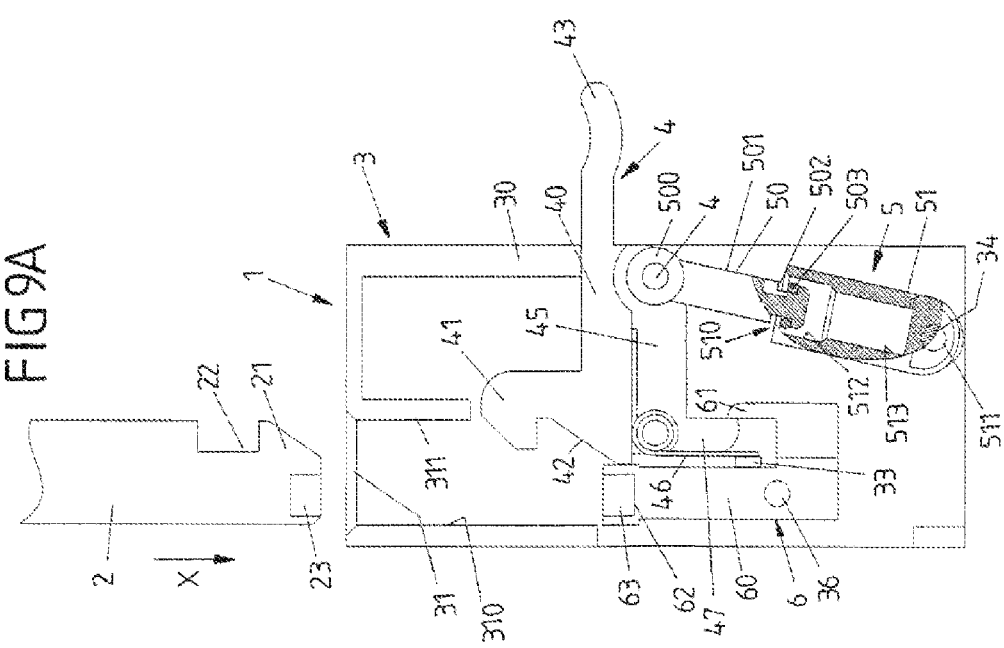

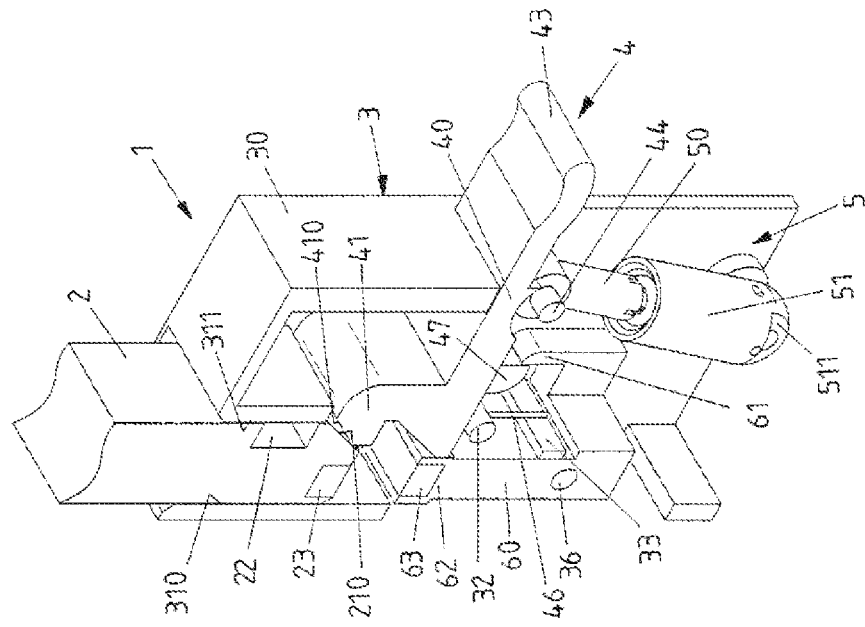
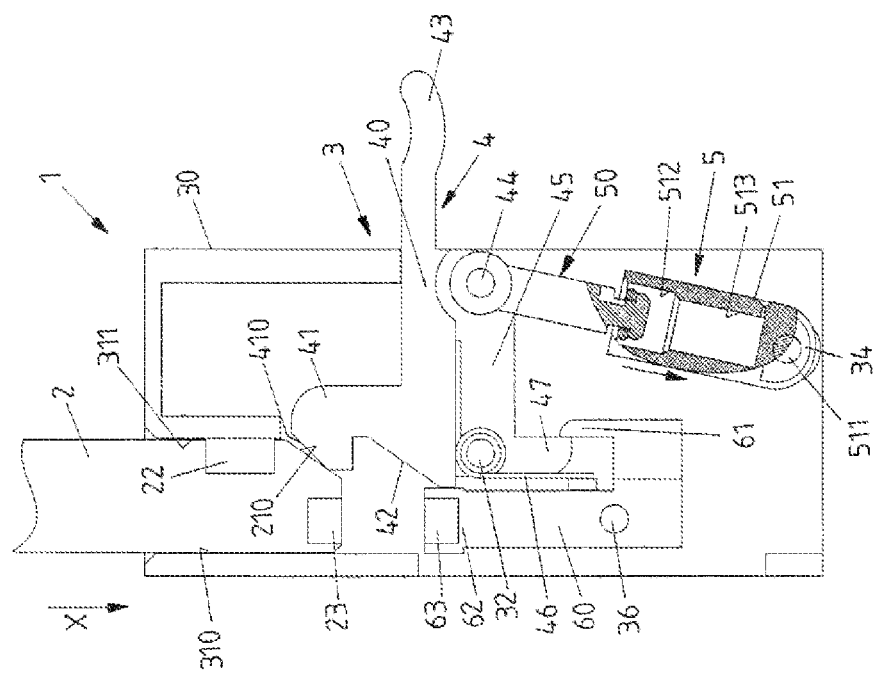

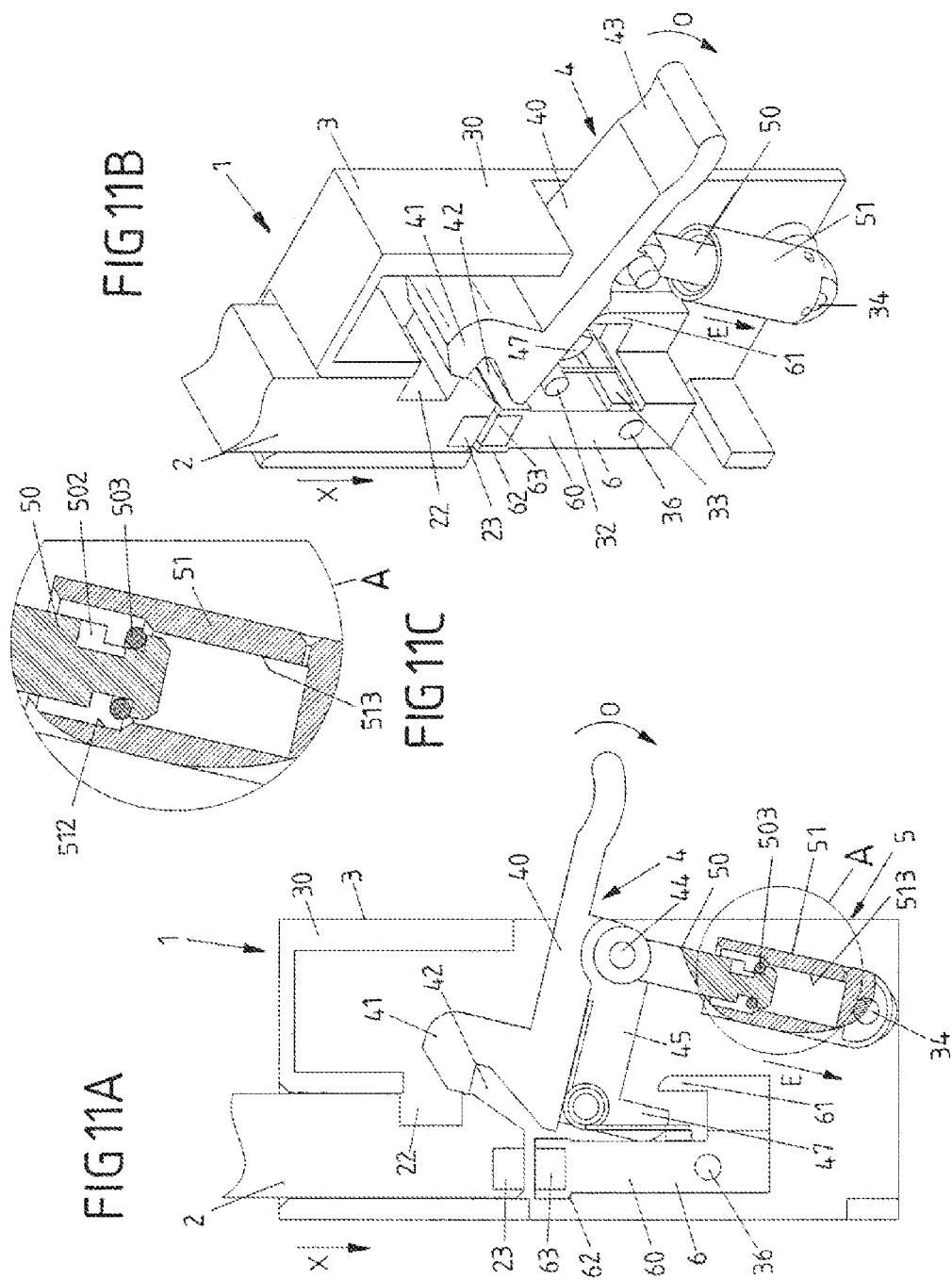

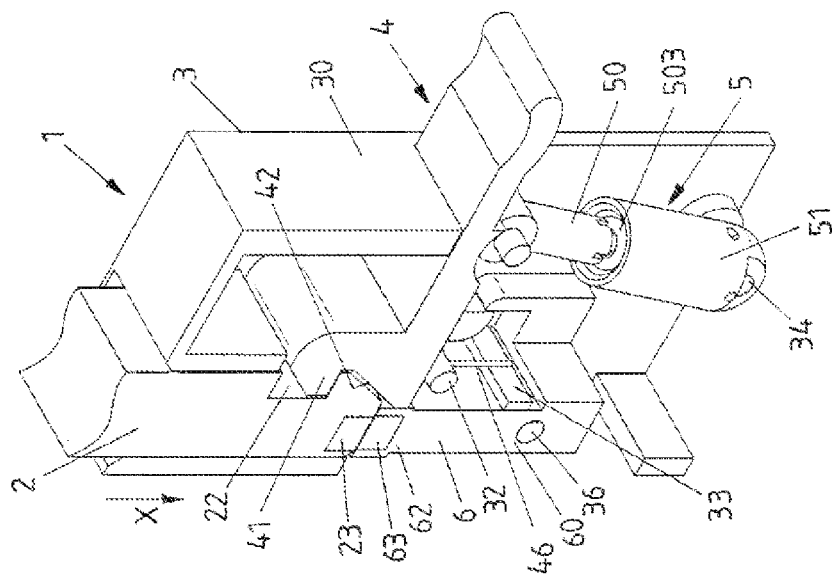

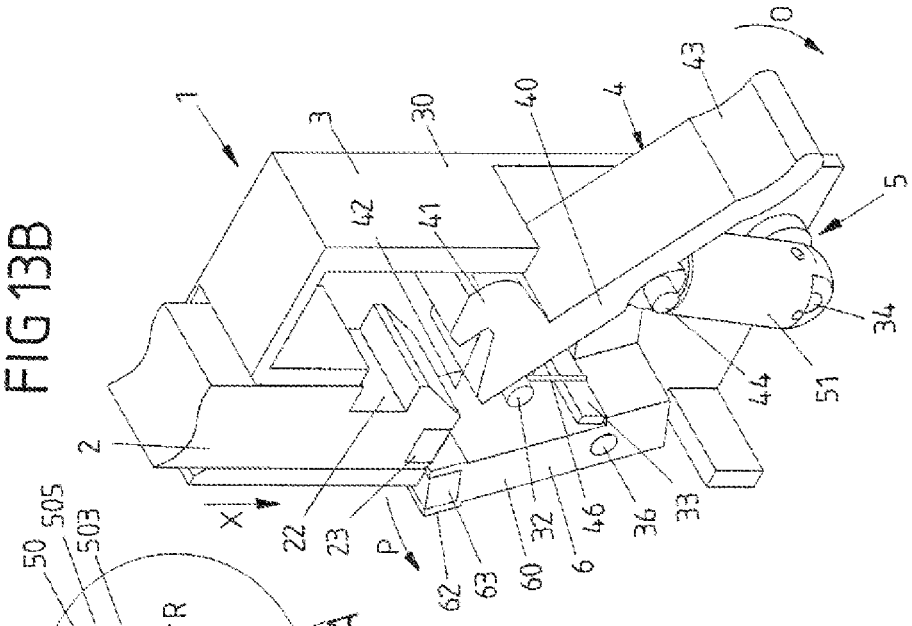
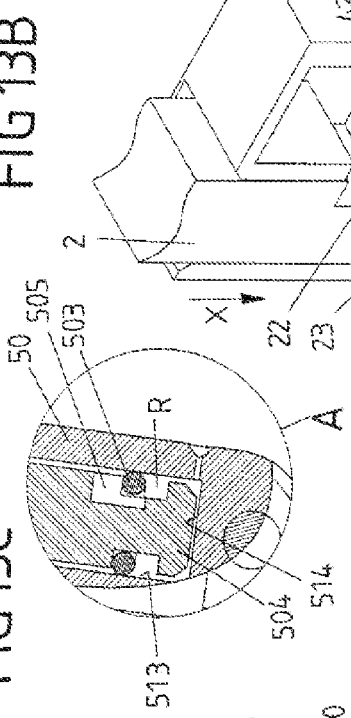
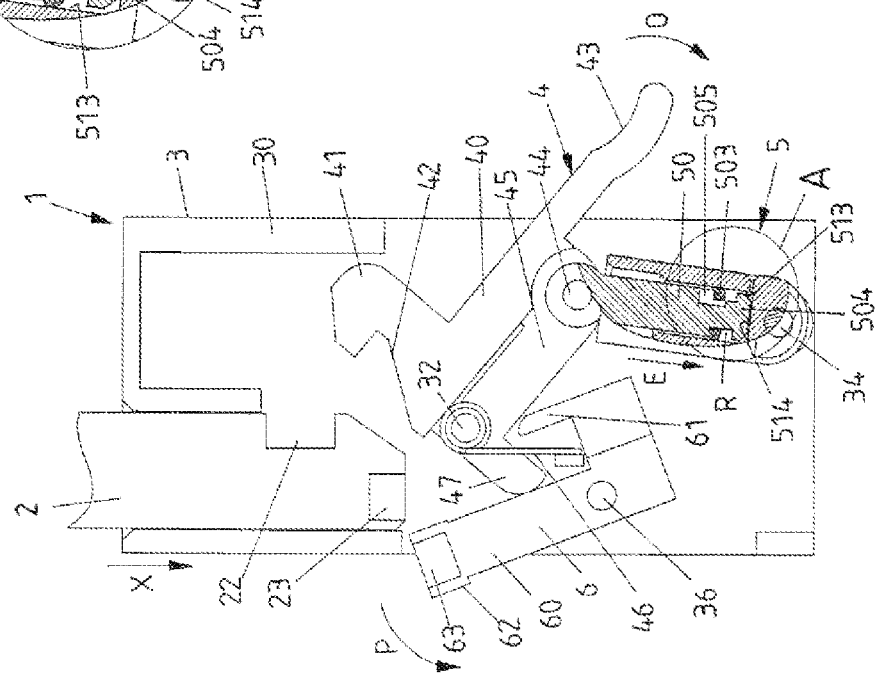

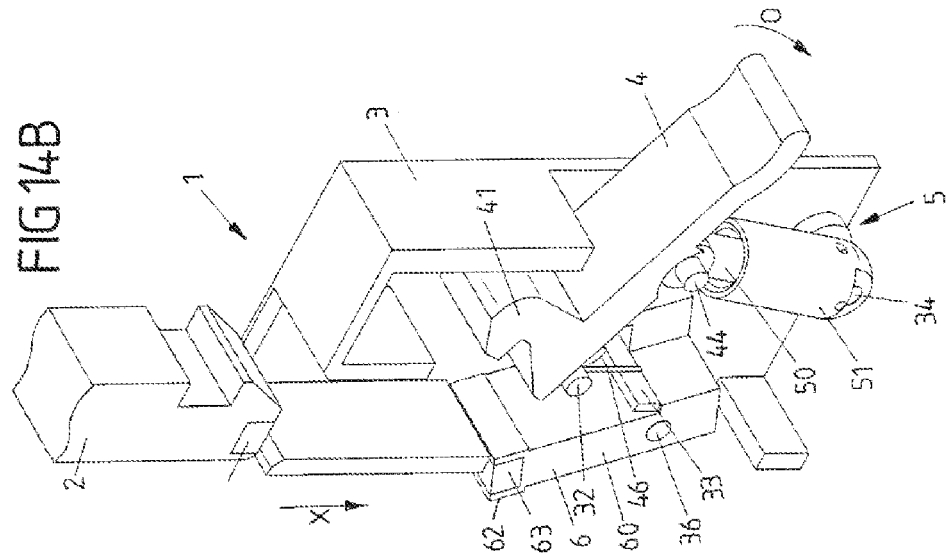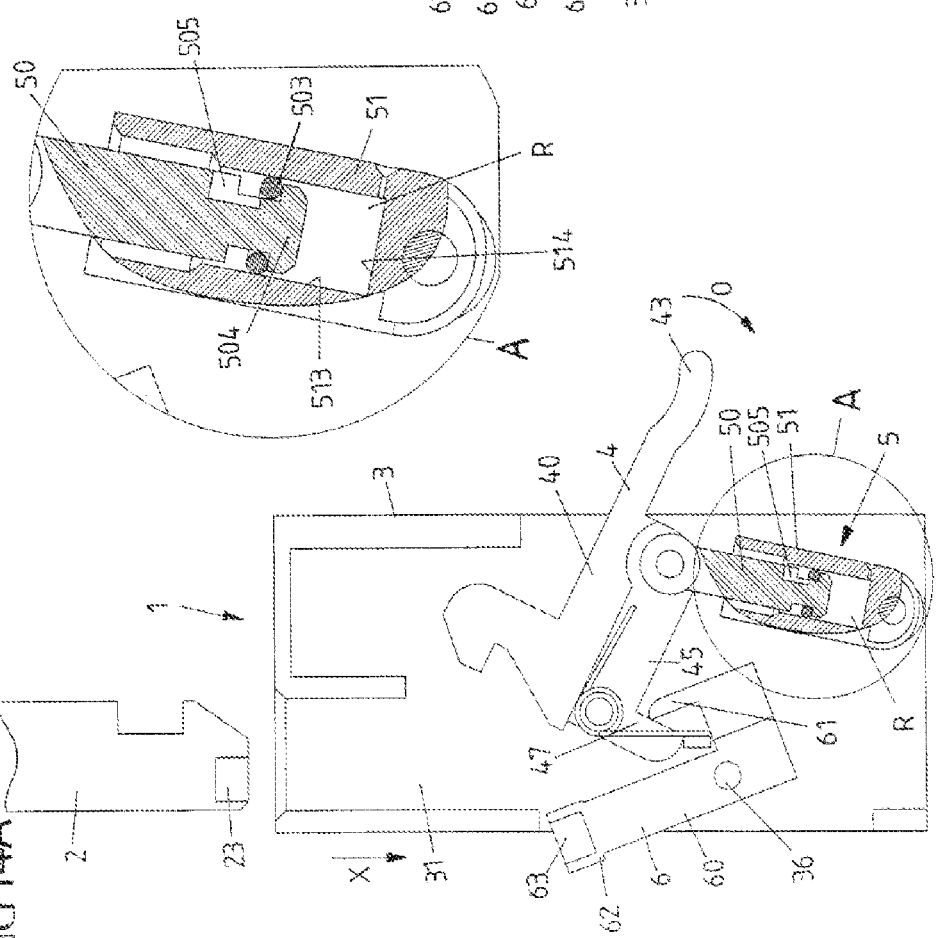

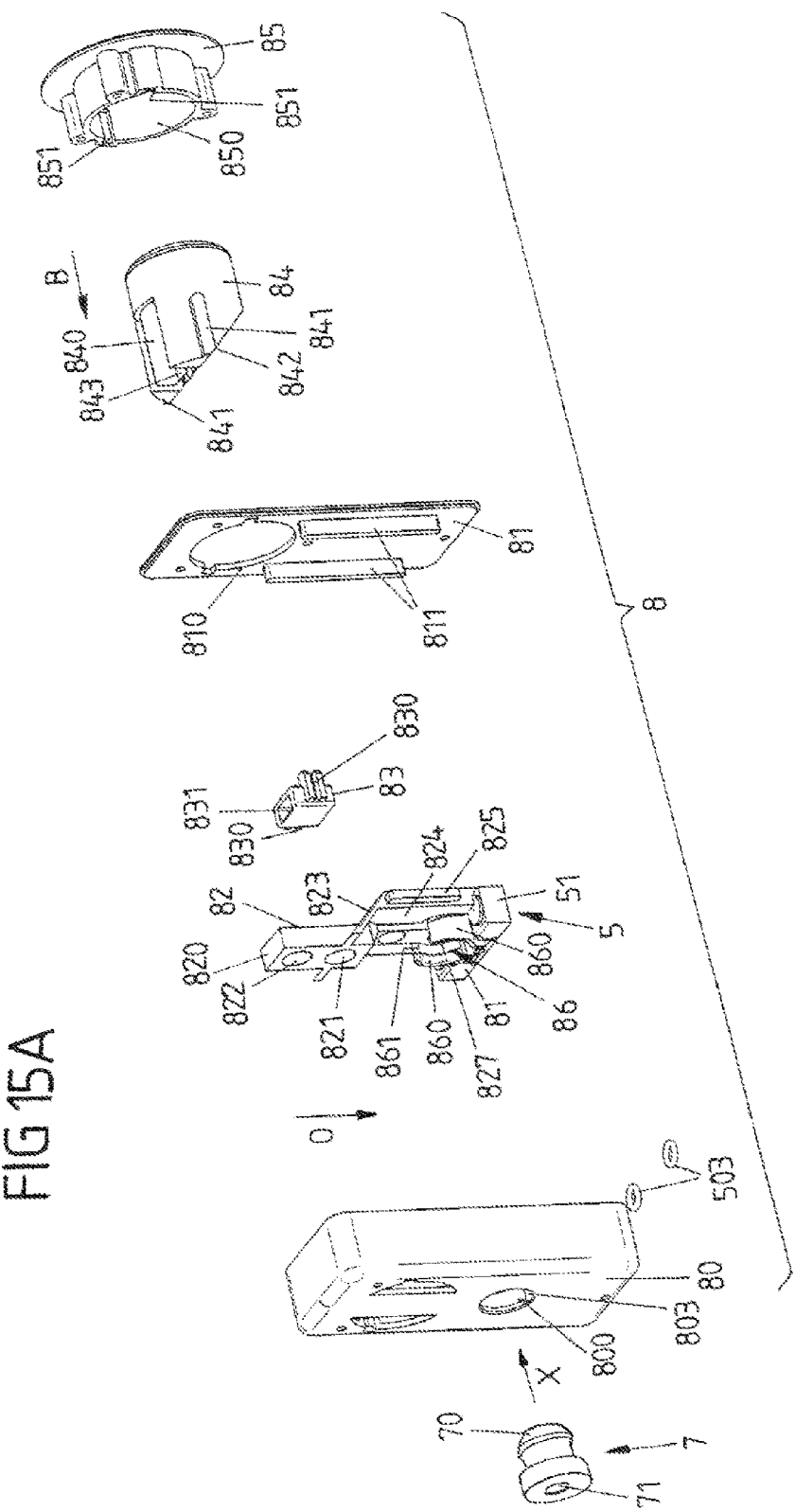

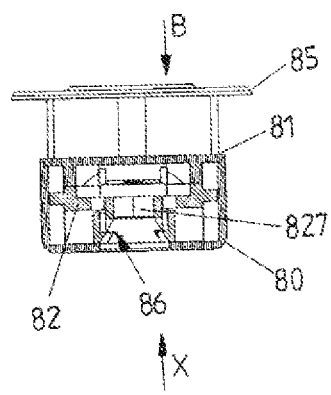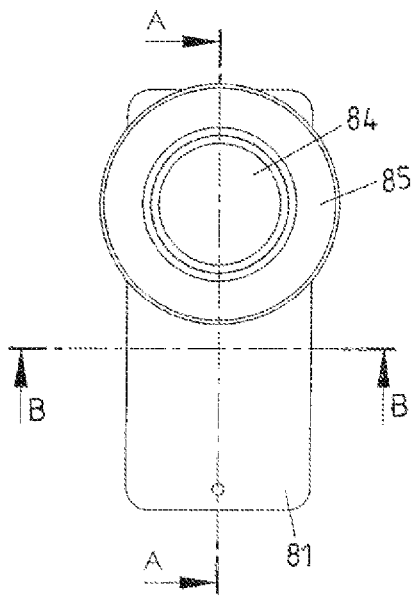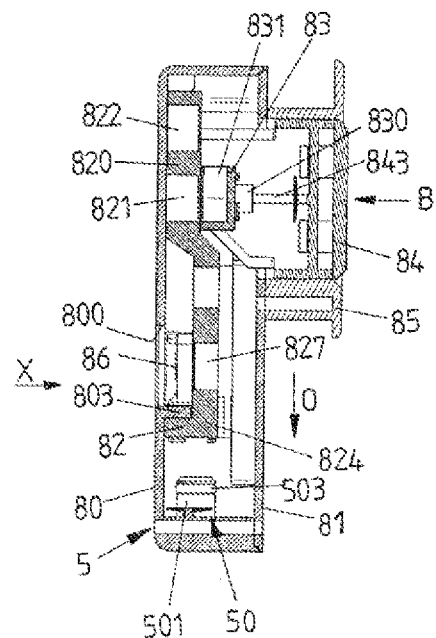

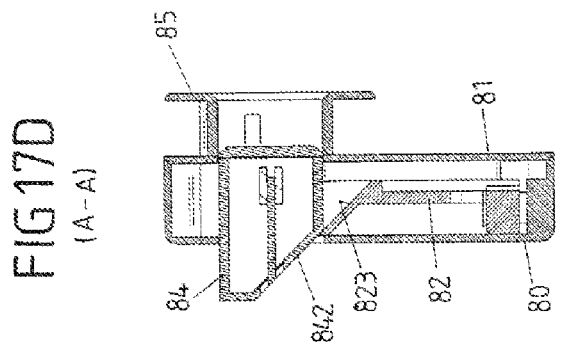
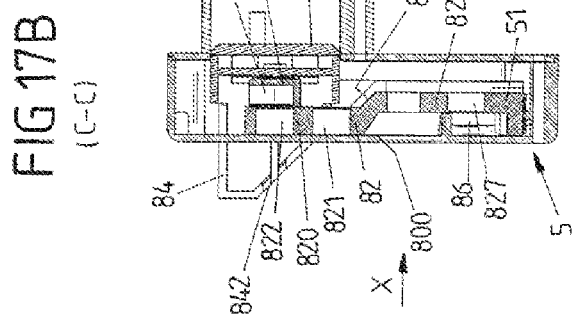
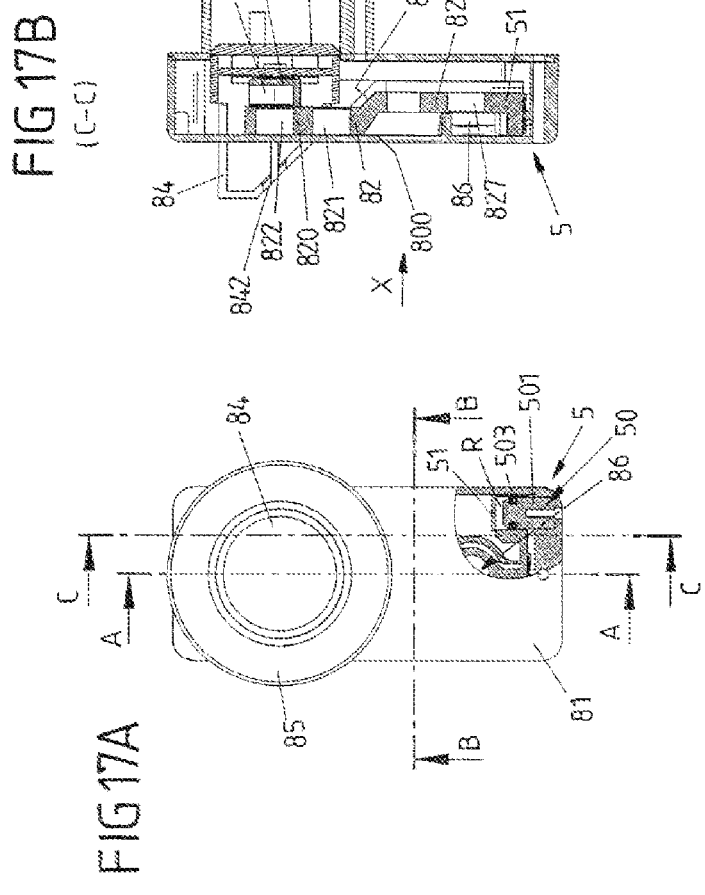
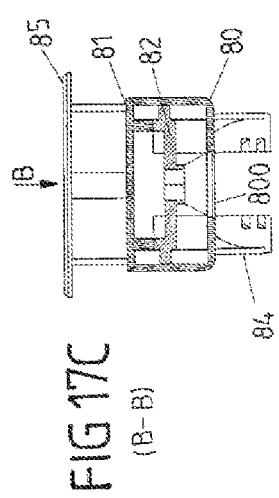

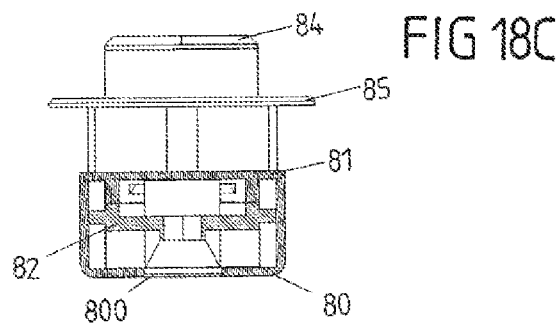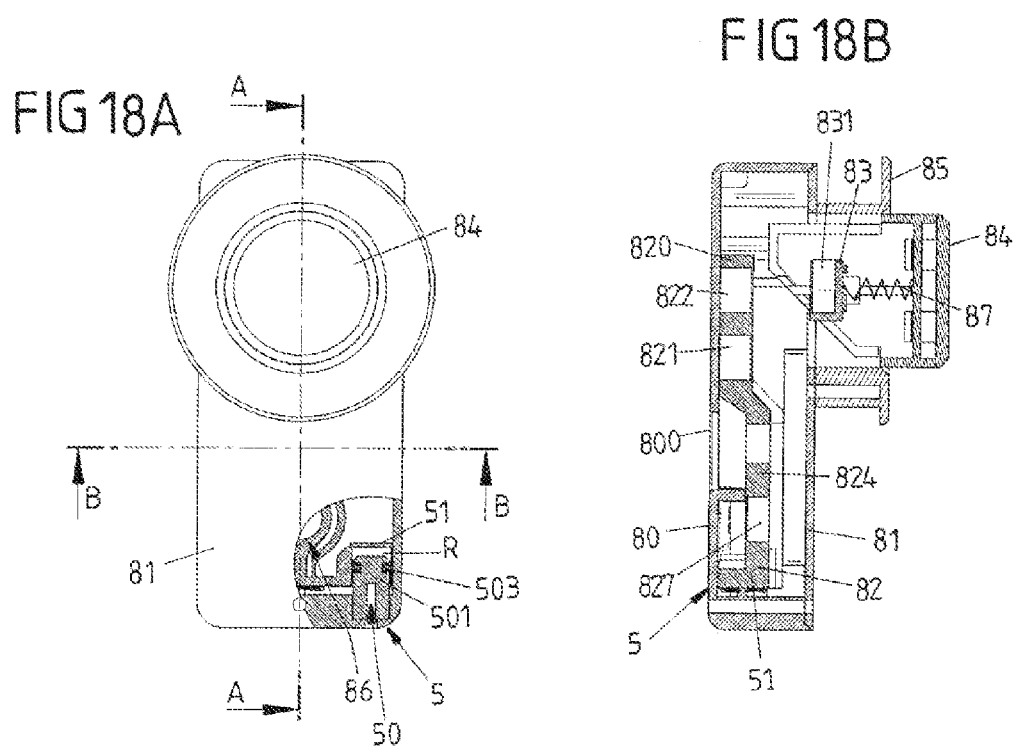

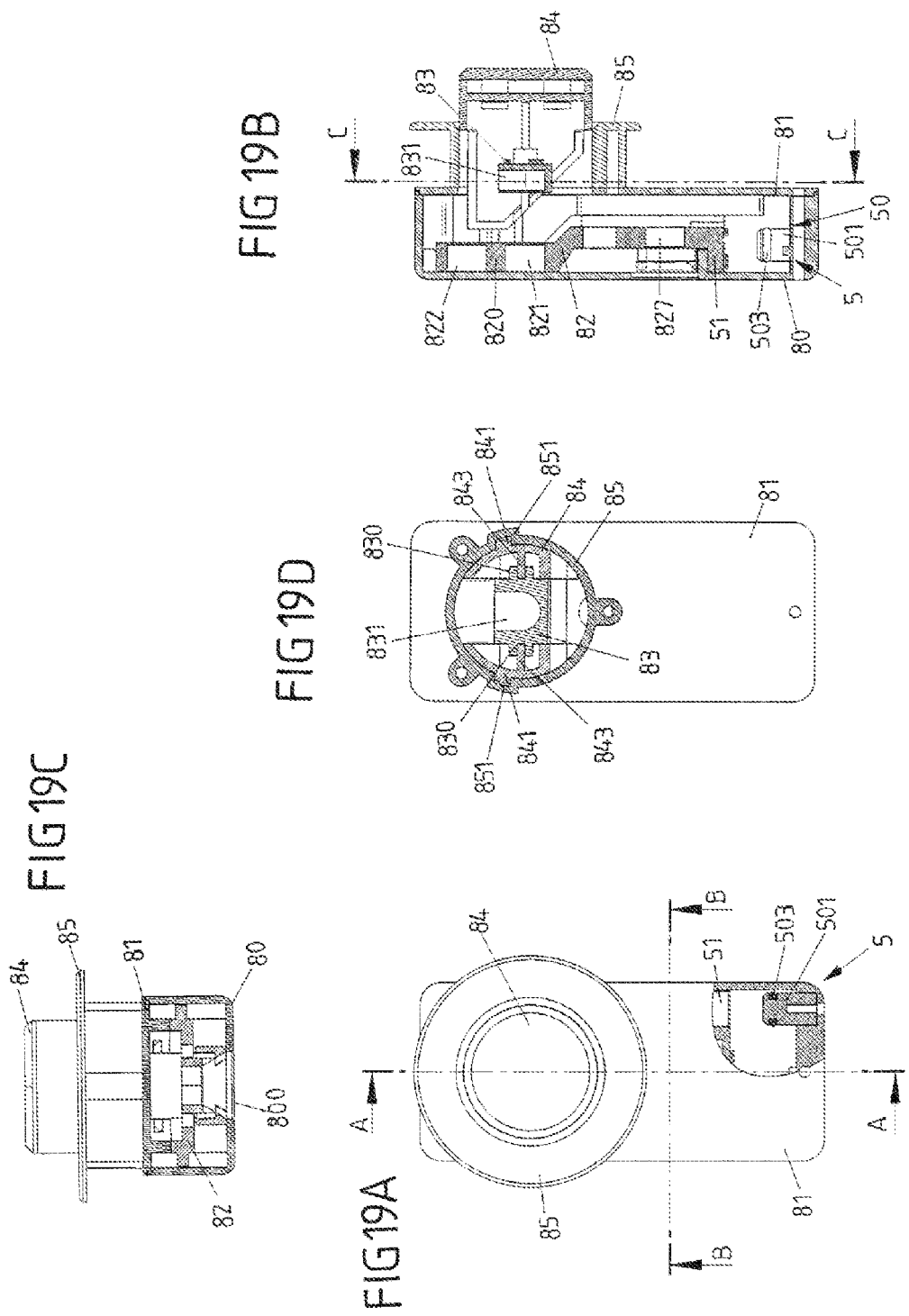

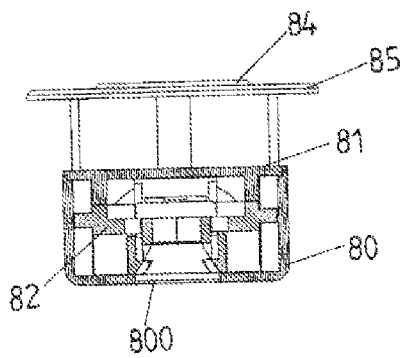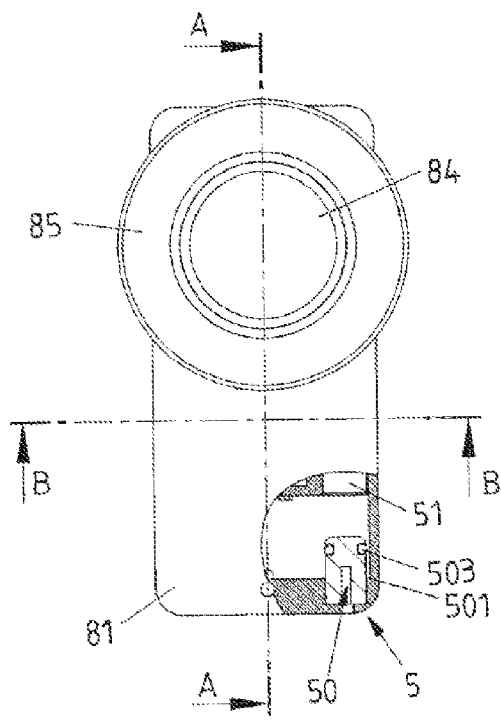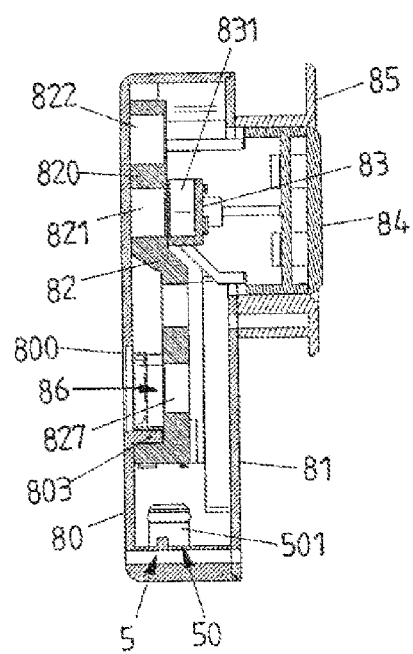

HAND-ACTUATED CLOSING DEVICE WITH A DELAYING SYSTEM

CROSS-REFERENCE TO RELATED APPLICATIONS

This application is the United States National Phase of International Application No. PCT/EP2015/064420 filed Jun. 25, 2015, and claims priority to German Patent Application No. 10 2014 213 383.1 filed Jul. 9, 2014, the disclosures of which are hereby incorporated in their entirety by reference.

BACKGROUND OF THE INVENTION

Field of the Invention

The invention relates to a hand-actuated closure.

Description of Related Art

A closure device of this type includes two closure parts which are fittable together along a closing direction and are mechanically interconnected in a closed position. As a result of releasing the mechanical connection, the closure parts are able to be released from one another in order to open the closure device in this manner.

One of the closure parts comprises a housing and a locking element, which is arranged so as to be movable on the housing and communicates with the other closure part in the closed position in a positive locking, non-positive locking, frictional locking or other manner to produce the mechanical connection between the closure parts. In this connection, in the closed position, in which the closure parts of the closure device are mechanically interconnected, the locking part assumes a first position on the housing, and as a result of manual actuation, is able to be moved out of the first position into a second position in order to release the closure parts from one another. In the second position, the connection to the other closure part is eliminated and consequently the mechanical connection between the closure parts is released such that it is possible to remove the closure parts from one another.

In order to reset the locking element into its first position, a resetting force acts in the direction of the first position. As a result of resetting the locking element into the first position, it is possible to ensure that the closure parts, when fitted together, are able to lock together for closing the closure device.

Such a closure device can be used, for example, in the case of a pushchair. In the case of such a pushchair, an attachment, in which a child is able to sit or lie, can be connected to a sub frame by means of one or several closure devices, it being possible to remove the attachment from the sub frame as a result of releasing the closure devices.

If, for example, a closure device is provided on each of two sides on a pushchair, it can be necessary to open both closure devices at the same time to remove the attachment. This, as a rule, is only possible with two hands because it must be ensured that both closure devices are situated simultaneously in a non-locked, open position. This can be awkward and, in particular in the case of pushchairs, not very easy because potentially not both hands are freely usable when other objects are being carried or a child has to be taken out of the pushchair prior to removing the attachment.

Conventional closure devices automatically snap closed again after opening, which produces the advantage that reliable closing of the closure devices, for example when mounting an attachment on a sub frame of a pushchair, can be ensured, however, simultaneously the disadvantage that it is not possible to open the closure devices one-handedly one after another.

One-handed opening of several closure devices on a pushchair can certainly be made possible as a result of the closure devices not closing again automatically after opening and consequently it is possible to open several closure devices one after another. However, this produces the disadvantage that, once the attachment has been fitted onto the sub frame, the closure devices also have to be closed again by hand. If this is forgotten, a secure hold of the attachment on the sub frame is possibly not ensured.

There is a need for closure devices which are versatile, convenient to close and in particular also convenient to open. There is a need, in particular, for closure devices which can be used in combination and nevertheless can also be actuated with one hand in a simple, convenient manner.

SUMMARY OF THE INVENTION

In the case of a magnetic closure disclosed in U.S. Pat. No. 7,775,567 for closing a laptop computer, a magnetic element on a lid of the laptop computer in a closed position faces an opposite-poled magnetic element on a housing body of the laptop computer. The magnetic element of the lid can be adjusted into an open position from the closed position, it being possible to provide a spring-elastic blocking element which prevents the magnetic element returning into the closed position.

GB 2 486 813 A discloses a pushchair with a removable seat which is mechanically latched to a sub frame of the pushchair in the fitted position.

EP 1 291 260 B1 discloses a pushchair where a sensor is provided to generate an alarm if an attachment is not fully locked to a sub frame.

It is an object of the present invention to provide a closure device which can be operated, in particular opened and closed, in a simple manner and which provides reliable locking in the closed position.

Accordingly, the closure device includes a delaying system which is constituted to delay the resetting of the locking element from the second position into the first position under the effect of an active resetting force in such a manner that the locking element does not move back into the first position until a predetermined delay time has elapsed.

The present invention proceeds from the concept of enabling resetting of the locking element into the first position, corresponding to the closed position, only in a delayed manner. Once the closure device has been opened, the locking element consequently remains for a predetermined time in the open, second position in which the connection to the other closure part is eliminated and the closure part is consequently open.

By the closure device not immediately reclosing after opening on account of the resetting movement of the locking element being delayed, it is possible to actuate several closure devices in a simple, convenient manner one after another. If, for example, several closure devices are used to couple a pushchair attachment to a sub frame of a pushchair, a first closure device can be opened by hand initially and then a second closure device in order to remove the attachment from the sub frame. This is possible with one hand in a simple, convenient manner because after opening, the closure devices remain in the open position at least for a predetermined delay time.

The resetting of the locking element is delayed as the resetting force acts. If the closure parts (initially) remain in their position corresponding to the closed position once the locking element has been transferred into the second position for opening the closure device, the resetting force acts in the direction of the first position to reset the locking element. Said resetting, however, is delayed by the delaying system, for example by the locking element being braked or not released until a predetermined time has elapsed such that the locking element does not move back into the first position and consequently relock the closure device until the predetermined delay time has elapsed.

The predetermined delay time, prior to the elapsing of which the locking element is not able to move back into the first position corresponding to the closed position, can be, for example, several seconds, e.g. between 10 s and 30 s, for example 20 s, or even several minutes, for example 2 min. In principle, the delay time can be freely adjusted as a result of dimensioning and configuring the delaying system and can be adapted to the requirements of the application of the closure device.

The resetting of the locking element is preferably effected automatically on account of a resetting force which is provided based on a spring mechanism or in a magnetic manner. The delaying system, in this connection, is constituted so as to delay the locking element in such a manner that the locking element does not reach the first position until the delay time has elapsed. The delaying system consequently sets up a delay or braking force which delays the resetting of the locking element to counter the active resetting force.

The delaying system can operate, for example, in a pneumatic, hydraulic, electric or electro-magnetic manner.

An electric delaying system can use, for example, electrically charged capacitor plates which are charged up electrically to provide a delay and provide an electrostatic braking force which brings about a predetermined delay.

An electromagnetic delaying device can use, for example, an electromagnet which provides a magnetic delaying force for a predetermined delay time. Such an electromagnet can be energized, for example, by means of an electronic system or by means of a suitable capacitor for providing a delaying force.

Conceivable is also a delaying system which utilizes the induction of an eddy current when an electrically conductive component is moved in a magnetic field.

In particular, in the case of electric or electromagnetic delaying systems, but also in the case of other delaying systems, it can be provided that the delaying system provides a braking force which delays the resetting by slowing down the movement of the locking element. In said case, the locking element is continuously put back in a retarded manner during the delay time and does not reach its first position until the delay time elapses.

As an alternative to this, it is also possible for the delaying system to block the resetting during the predetermined delay time, for example in an electronically controlled manner, and to hold the locking element in the second position in this way. Once the delay time has elapsed, the locking element is then released and can be reset in the direction of the first position.

In the case of a pneumatic or hydraulic development of the delaying system, the delaying system can, for example, comprise a first component and second component which are adjustable relative to one another and together enclose a space, at least in the second position of the locking element. When the locking element is moved, the components of the delay system are moved toward one another such that the volume of the space enclosed between the components is modified. If the volume of the space is small in the second position of the locking element and the volume of the space is increased in size when the locking element is reset in the direction of the first position, a negative pressure force, which brakes a movement of the locking element in the direction of the first position and consequently delays the movement, is brought about in the space.

In principle, other types of delaying systems are also conceivable and possible. For example, the delaying system can be also be realized as a mechanical braking system where the components rub against one another in a braking manner.

In one development, the closure parts comprise in each case at least one magnetic element. The magnetic elements of the closure parts serve for supporting the fitting of the closure parts in a magnetic manner for closing the closure device. In this way, it is possible to provide a closure device which is able to be closed in a particularly simple, haptically pleasant manner. Thus, for closing the closure device, the closure parts simply have to be fitted together (approximately). On account of the magnetic attraction between the magnetic elements, the closing is then effected in a supported or even—in the case of suitable dimensioning of the magnetic elements—largely automatic manner by the closure parts being pulled into engagement with one another and thereby producing the mechanical connection.

A magnetic element, in this sense, can be constituted, for example, by a permanent magnet. Thus, it is conceivable to arrange at least one permanent magnet on each closure part. However, it is also conceivable and possible for a permanent magnet to be arranged on one closure part and a magnetic fitting in the form of component produced from a ferromagnetic material to be arranged on the other closure part.

In a specific development, to support the closing of the closure device, a magnetic element can be arranged, for example, on the locking element or on a component of the closure part comprising the locking element that is entrained when the locking element is moved. A magnetic attraction that supports the closing consequently acts between the locking element and the other closure part or between the component entrained when the locking element is moved and the other closure part. In this way, it can be ensured that locking is produced in a reliable manner between the other closure part and the locking element when the closure device is closed.

In addition, it can be achieved in this way that the opening of the closure device can be effected in a particularly pleasant manner. Thus, it can be provided that, to open the closure device, the locking element has to be moved in an opening direction that is different from the closing direction. The opening direction can be directed, for example, transversely or at an angle with respect to the closing direction. When the locking element is moved in the opening direction, the magnetic element arranged on the locking element or the component with the magnetic element arranged thereon that is entrained when the locking element is moved is moved relative to the other closure part, such that the magnetic attraction acting between the closure parts is reduced and consequently, once the locking element has been opened, the closure parts are able to be removed from one another in a simple manner.

A resetting device, which acts between the housing and the locking element and serves for providing a resetting force, is preferably provided to reset the locking element. The resetting device can be constituted, for example, based on a spring mechanism, for example as a spring element based on a spring mechanism in the form of a compression spring. The resetting device can also be realized, for example, in a magnetic manner and comprise magnetic elements which exert a magnetic resetting force on the locking element in the direction of the first position.

In principle, it is also conceivable and possible for the resetting force to be provided by magnetic elements which are provided on the closure device for supporting the closing of the closure parts. If a magnetic element supporting the closing is provided on the locking element and if the locking element has been moved out of its first position for opening the closure device, when the closure parts are fitted together for closing the closure device, as a result of magnetic attraction a force acts on the locking element between the magnetic element of the locking element and the magnetic element of the other closure part, said force is (also) directed in the direction of the first position with a vector component and consequently is able to bring about a resetting of the locking element.

In a further development, the housing comprises an engagement opening, into which the other of the closure parts is able to be inserted with a latching portion. The housing comprises a guide portion which extends along the closing direction, connects to the engagement opening in the closing direction and is constituted for the purpose of guiding the other of the closure parts into the closed position when it is being fitted onto the housing. In particular, a latching portion of the closure part is able to slide along the guide portion such that the first portion is guided in a reliable manner into engagement with the locking element of the closure part.

The locking element preferably comprises a latching portion for locking in a latching manner with the other closure part. In one development, in this connection, it is conceivable and possible for the latching portion to be arranged in a resiliently springy manner in relation to a housing portion of the locking element. On account of the resiliently springy development of the latching portion, the locking element, when the closure parts are fitted together, does not have to be deflected out of its first position, but remains in the first position. Simply the latching portion, which is connected in a resiliently springy manner to the housing portion of the locking element, deflects and moves into positive locking engagement with the associated latching portion of the other closure part.

If the latching portion is not realized in a resiliently springy manner, but is arranged rigidly on the locking element, the locking element yields (slightly) when the closure parts are fitted together until the latching portion of the locking element moves into engagement with the latching portion of the other closure part.

In a specific development, the locking element can be mounted on the housing, for example, so as to be pivotable. A pivot axis about which the locking element is pivotable, can, in this connection, for example, extend transversely or parallel to the closing direction. As an alternative to this, it is also conceivable and possible to mount the locking element so as to be displaceable on the housing. To open the closure device, the locking element can consequently be pivoted or displaced relative to the housing in order to move the latching portion of the locking element out of engagement with the latching portion of the other closure part.

The locking element is consequently moved for opening the closure device as a result of pivoting or displacing. The moving of the locking element out of the first position into the second position is effected along an opening direction (which extends in a rectilinear or curved manner) which preferably differs from the closing direction and in particular is not directed in the opposite direction to the closing direction. The opening direction can be directed, for example, at least approximately transversely with respect to the closing direction or at an oblique angle with respect to the closing direction.

The locking element can be actuated manually by a user, for example by a user taking hold of a handle or the like connected to the locking element and as a result moving the locking element, for unlocking the closure device, out of the first position in the direction of the second position. Such a handle can be formed rigidly with the locking element. As an alternative to this, however, it is also conceivable and possible to provide an actuating element which is arranged on the housing so as to be adjustable along an actuating direction and acts on the locking element during actuation for moving the locking element out of the first position. The actuating element can be guided on the housing, for example so as to be displaceable in a rectilinear manner and, for example, can be constituted as a push button which can be pressed into the housing for actuating the locking element.

The actuating element interacts with the locking element in order to adjust the locking element, for opening the closure device, out of the first position in the direction of the second position. To this end, the actuating element can comprise, for example, a slanting surface which is directed at an angle to the actuating direction and is constituted to run up onto an associated slanting surface of the locking element when the actuating element is actuated and, as a result, adjust the locking element out of the first position. The slanting surface of the actuating element, on the one side, and the slanting surface of the locking element, on the other side, are formed and directed such that when the actuating element is moved in the actuating direction, the slanting surfaces slide on one another and cause an adjusting force to act on the locking element. The actuating force, which is directed along the actuating direction, is consequently deflected into an adjusting force along the opening direction for adjusting the locking element out of the first position in the direction of the second position.

The actuating direction can be directed, for example, perpendicular to the opening direction. The slanting surfaces can extend, for example, at an angle of approximately 45° both with respect to the actuating direction and to the opening direction.

In a further development, in addition, it is possible to provide a preload element which is guided on the actuating element so as to be adjustable along the actuating direction and is preloaded in a resilient manner in relation to the actuating element, for example by means of a spring element that is based on a spring mechanism or also by means of suitable magnetic means. The preload element serves for resetting the actuating element in opposition to the actuating direction after an actuation. If the actuating element, for example an actuating button, has been adjusted in the actuating direction, the actuating element is reset once again, after actuation, into its starting position in opposition to the actuating direction as a result of the preloading effect of the preload element.

The preload element can additionally comprise a magnetic element which, in the first position of the locking element, faces a second magnetic element of the locking element in a magnetically attracting manner and, in the second position of the locking element, faces a third magnetic element of the locking element in a magnetically repelling manner. As a result, it can be brought about that the position of the preload element relative to the locking element changes along the actuating direction in dependence on the position of the locking element, which is able to be used for the purpose of indicating whether the closure device, after opening and after renewed closing, has reached its closed position in the correct manner and consequently has once again been locked.

The actuating element, first of all for opening the closure device, can thus be adjustable out of a starting position in the actuating direction for adjusting the locking element out of the first position into the second position. On account of the magnetically repelling interaction between the first magnetic element of the preload element and the third magnetic element of the locking element, once the actuation of the actuating element has been terminated, the preload element is repelled by the locking element in opposition to the actuating direction and, as a result, the actuating element is adjusted beyond the starting position in opposition to the actuating direction such that the actuating element protrudes beyond the starting position, for example out of the housing. The preload element with its first magnet arranged thereon does not face the second magnet of the locking element again in a magnetically attracting manner until the locking element has been reset in a time-delayed manner into the first position, such that the preload element is pulled toward the locking element and, as a result, the actuating element is moved in the actuating direction back into its starting position. If the locking element does not move back into its first position, neither is the actuating element adjusted out of its highlighted position back into the starting position, which is clearly visible from the outside and consequently indicates that the closure device has been locked in an incomplete manner.

It is also conceivable and possible for the actuating element to be preloaded in the direction of the highlighted position in relation to the housing by means of a spring. In said case, the third magnetic element on the locking element can be omitted. In the first position, the first magnetic element of the preload element faces the second magnetic element of the locking element in a magnetically attracting manner and is, as a result, held in its starting position (the magnetically attracting action is to be dimensioned stronger for this than the preload force between the actuating element and the housing). If the locking element is conveyed into the second position, the magnetic attraction between the first magnetic element of the preload element and the second magnetic element of the locking element is weakened such that the actuating element is moved beyond the starting position into the highlighted position in opposition to the actuating direction on account of the preload force between the actuating element and the housing.

The second magnetic element of the locking element can also serve for supporting the closing operation.

A status indicator can also be provided by using a sensor, detecting if the closure device is not properly locked and indicating correspondingly, for example by means of a visual or acoustic signal.

A closure device of the type described here can be used in a versatile manner.

For example, a closure device of the type described here can be used, where applicable, in combination with other closure devices, on a pushchair—for example to couple an attachment to a sub frame—or on a child car seat for coupling a seat part to a sub frame.

However, a closure device of the type described here can also be used on containers, pockets, cases or other vessels; or closing devices, for example doors of buildings or furniture doors, can also be locked using one or several closure devices of the type described here.

However, in principle, a closure device of the type described here can also be used for closing and locking completely different types of objects.

A delaying system of the type described here can be used, in principle, in the case of completely different mechanical or magnetic mechanical closure devices. For example, the closure device can be developed such as described in WO 2008/006357 A2, WO 2008/006354 A2, WO 2009/092368 A2, WO 2010/006594 A2, WO 2008/006356 A2 WO 2009/010049 S2, WO 2009/127196 A2, WO 2014/090926 A1 and international application PCT/EP 2013/060762. The contents of said applications are also to be included fully in the present case.

BRIEF DESCRIPTION OF THE DRAWINGS

The concept underlying the invention is to be explained in more detail below by way of the exemplary embodiments shown in the figures.

FIGS. 1A, 1B show perspective exploded views of a first exemplary embodiment of a closure device;

FIGS. 2A, 2B show views of the closure device prior to closing;

FIGS. 4A, 4B show views of the closure device during closing;

FIG. 4C shows a part sectioned view of the detail A of the closure device according to FIG. 4A;

FIGS. 6A, 6B show views of the closure device during opening;

FIG. 6C shows a part sectioned view of the detail A of the closure device according to FIG. 4A;

FIGS. 7A, 7B show views of the closure device in an open position;

FIG. 7C shows a part sectioned view of the detail A of the closure device according to FIG. 7A;

FIGS. 9A, 9B show views of the closure device prior to closing;

FIGS. 10A, 10B show views of the closure device during closing;

FIGS. 11A, 11B show views of the closure device during closing;

FIG. 11C shows a part sectioned view of the detail A of the closure device according to FIG. 11A;

FIGS. 12A, 12B show views of the closure device in a closed position with the closure parts locked together;

FIGS. 13A, 13B show views of the closure device during opening;

FIG. 13C shows a part sectioned view of the detail A of the closure device according to FIG. 13A;

FIGS. 14A, 14B show views of the closure device in an open position;

FIG. 14C shows a part sectioned view of the detail A of the closure device according to FIG. 14A;

FIGS. 15A, 15B show exploded views of a third exemplary embodiment of a closure device;

FIG. 16A shows a top view of the closure device in a closed position;

FIG. 16B shows a sectioned view along the line A-A according to FIG. 16A;

FIG. 16C shows a sectioned view along the line B-B according to FIG. 16A;

FIG. 17A shows a top view of the closure device during opening;

FIG. 17B shows a sectioned view along the line A-A according to FIG. 17A;

FIG. 17C shows a sectioned view along the line B-B according to FIG. 17A;

FIG. 17D shows a sectioned view along the line C-C according to FIG. 17A;

FIG. 18A shows a top view of the closure device when resetting a locking element after opening the closure device;

FIG. 18B shows a sectioned view along the line A-A according to FIG. 18A;

FIG. 18C shows a sectioned view along the line B-B according to FIG. 18A;

FIG. 19A shows a top view of the closure device when resetting the locking element;

FIG. 19B shows a sectioned view along the line A-A according to FIG. 19A;

FIG. 19C shows a sectioned view along the line B-B according to FIG. 19A;

FIG. 19D shows a sectioned view along the line C-C according to FIG. 19B;

FIG. 20A shows a top view of the closure device in the open position;

FIG. 20B shows a sectioned view along the line A-A according to FIG. 20A; and

FIG. 20C shows a sectioned view along the line B-B according to FIG. 20A.

DETAILED DESCRIPTION

Figure 1A:
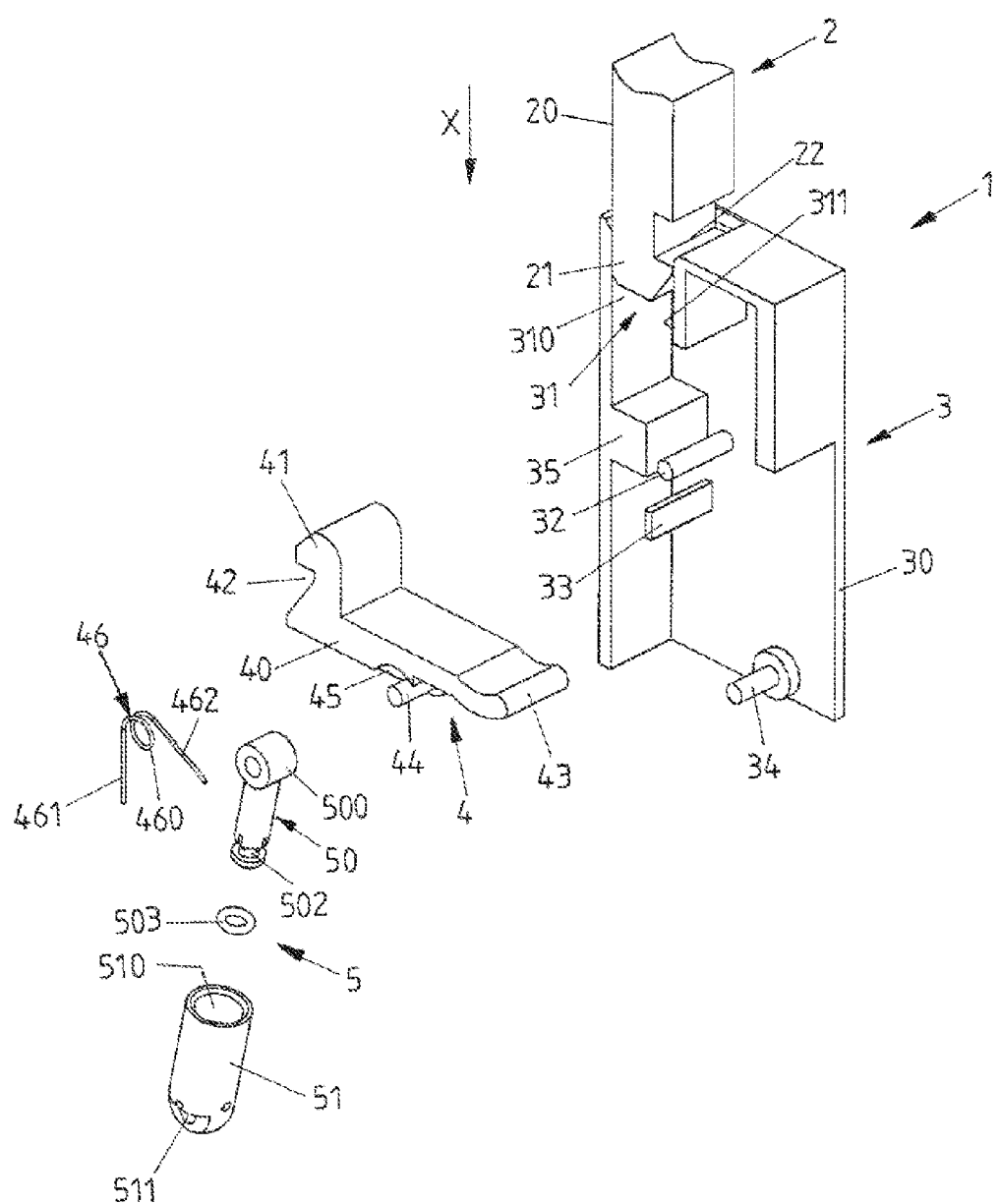

FIGS. 1A, 1B to 7A-7C show different views of a first exemplary embodiment of a closure device 1 which comprises a first closure part 2 (the so-called male part) and a second connection part 3 (the so-called female part). The closure parts 2, 3 are present separated from one another in an open position and can be fitted together for closing the closure device 1. In a closed position, the closure parts 2, 3 are locked together mechanically and are consequently held together.

A closure device 1 of this type can be used for releasably connecting arbitrary parts together.

In the exemplary embodiment shown, the first closure part 2 is constituted in a pin-shaped manner with a body 20 and a latching portion arranged thereon in the form of a latching lug 21. A recess 22, in which a latching lug 41 of a locking element 4 of the second closure part 3 engages in the locked position of the closure device 1, is formed in the body 20.

The second closure part 3 comprises a housing 30 in which an engagement opening 31 is formed. The first closure part 2 can be inserted in a closing direction X into the engagement opening 31 of the second closure part 3. Guide portions 310, 311, which extend along the closing direction X, connect to the engagement opening 31, between which guide portions the first closure part 2 is guided in the direction of the closing direction X when the closure device 1 is closed.

A locking element 4 is mounted on the housing 30 so as to be pivotable about a joint axis 32. The locking element 4 comprises, on a body 40, a latching portion in the form of a latching lug 41 and a recess 42 connecting thereto and is preloaded in the direction of a first position (see FIGS. 2A, 2B) in relation to the housing 30 by means of a spring element 46 which is arranged on the joint axis 32 and is in the form of a leg spring. The spring element 46, in this connection, is placed onto the joint axis 32 with a turn 460 and is supported by means of spring arms 461, 462 on the one side against a stop 33 of the housing 30 and on the other side against the body 40 of the locking element 4.

The locking element 4 comprises a web 45 which extends beneath the body 40 and includes a hinge point 450, which is passed through by the joint axis 32 and by means of which the locking element 4 is mounted so as to be pivotable on the housing 30.

A delaying system 5, which, in the case of the exemplary embodiment described, is developed as a pneumatic delaying system, operates between the locking element 4 and the housing 30. The delaying system 5 is hinged on the locking element 4 by means of a hinge point 500 on a joint axis 44, which is arranged on the web 45 of the locking element 4, and is additionally arranged in a pivotable manner on a joint axis 34 of the housing 30 by means of a hinge point 511.

The delaying device 5 includes a first component in the form of a piston element 50 and a second component in the form of a housing element 51. The piston element 50 comprises a cylindrical shaft 501, on which a ring-shaped recess 502 for receiving a sealing element 503 in the form of a ring-shaped O-ring is formed. The housing element 51 comprises, in contrast, an opening 510 into which the piston element 50 with the shaft 501 is able to dip, as is yet to be described below.

FIGS. 2A, 2B to FIGS. 7A-7C show the closure device 1 in different functional states, prior to closing (FIGS. 2A, 2B), during closing (FIGS. 3A, 3B and FIGS. 4A-4C), in a closed position (FIGS. 5A, 5B), during opening (FIGS. 6A-6C) and after opening when resetting the locking element 4 into its starting position (FIGS. 7A-7C).

Prior to closing (FIGS. 2A, 2B), the closure parts 2, 3 are present separated from one another. The first closure part 2 can be inserted into the engagement opening 31 of the second closure part 3 in a closing direction X by way of its latching portion 21 in order to close the closure device 1 in this manner.

Prior to closing, the locking element 4 is situated in a first position. In said first position, the locking element 4 is held by the preloaded spring action of the spring element 46. In said first position, the shaft 502 of the piston element 50 of the delaying system 5 dips into a first chamber 512 inside the housing element 51, there being a clearance between the sealing element 503 on the shaft 501 and the inside wall of the cylindrical chamber 512.

Figure 3A:
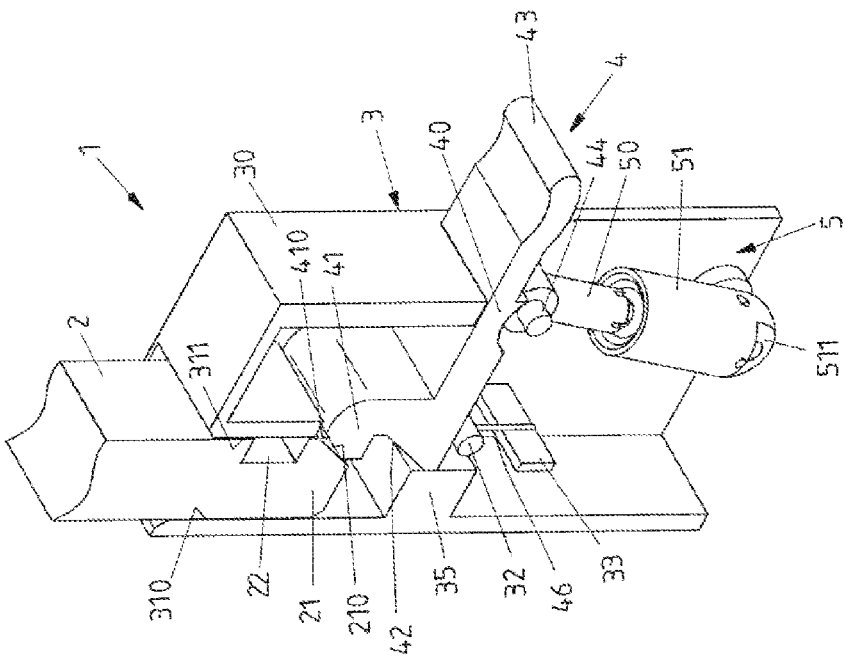
FIGS. 3A, 3B show views of the closure device during closing.
Figure 3B:
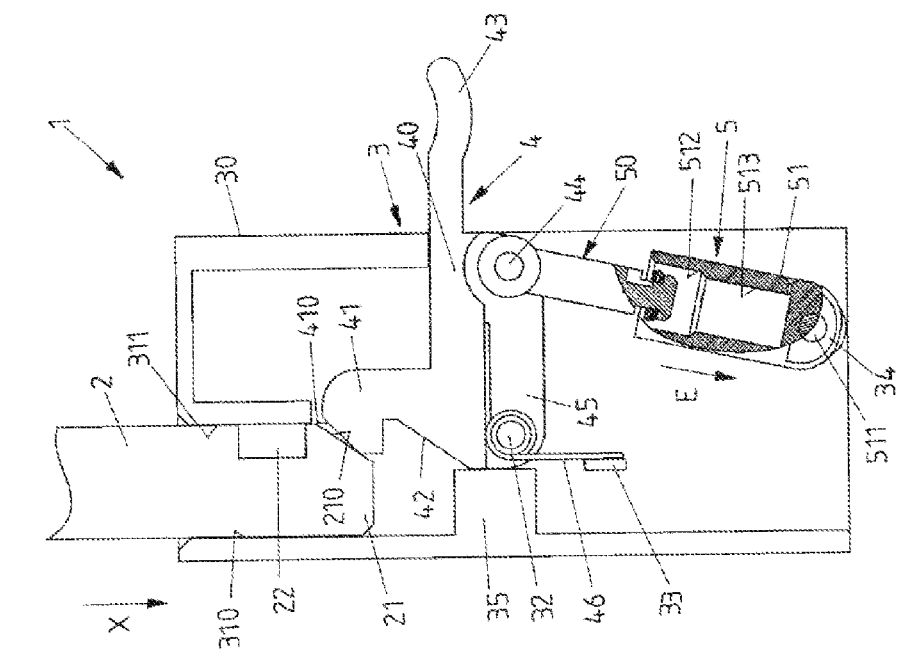
Figure 5A:
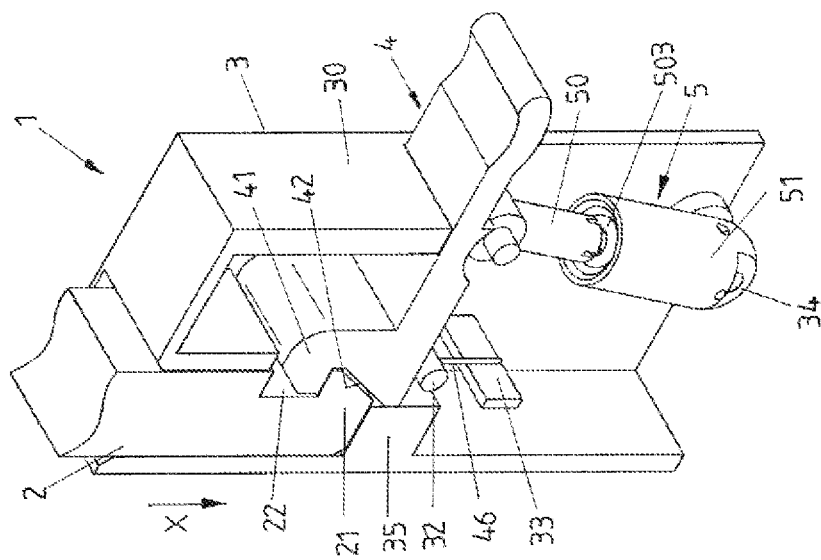
FIGS. 5A, 5B show views of the closure device in a closed position with the closure parts locked together.
Figure 5B:
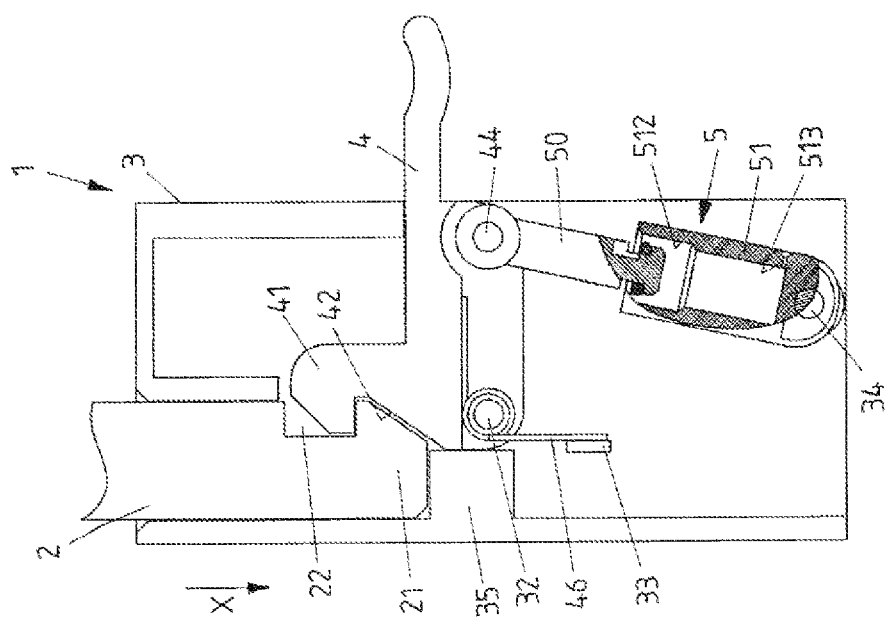
Figure 8A:
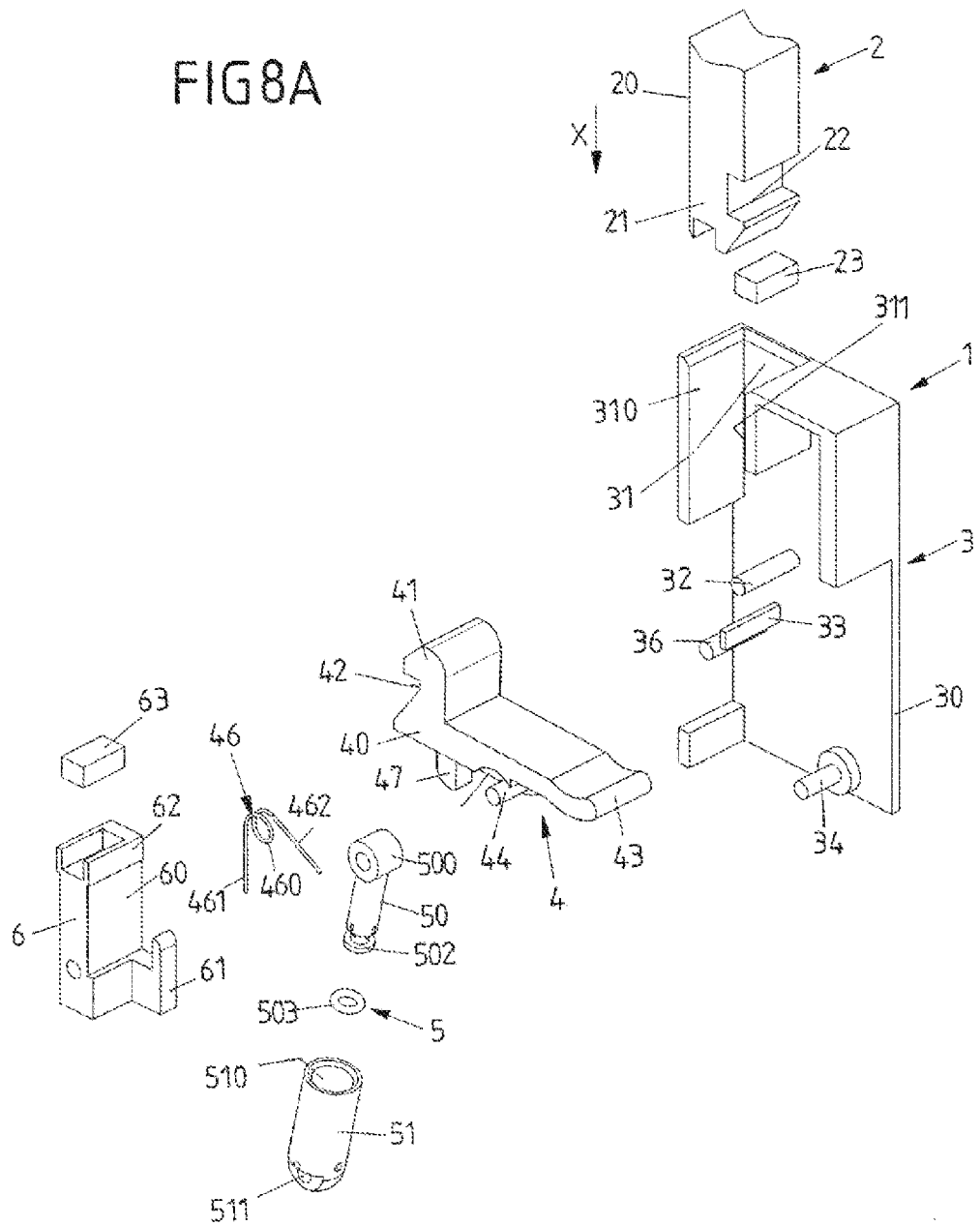
FIGS. 8A, 8B show perspective exploded views of a second exemplary embodiment of a closure device.
Figure 8B:
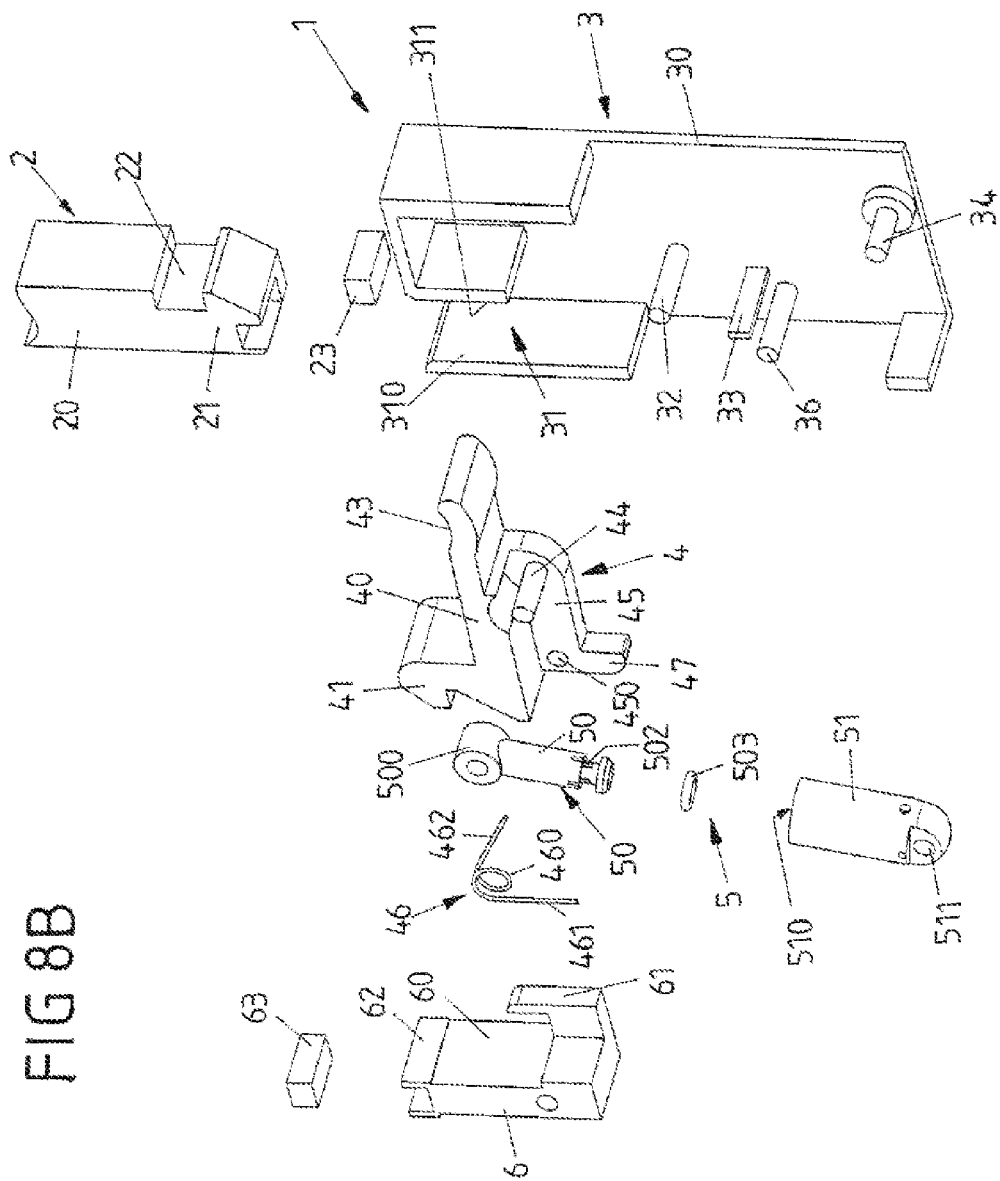

When the first closure part 2 is inserted into the engagement opening 31 in the housing 30 of the second closure part 3, the latching portion 21 of the first closure part 2, with a run-up inclination 210 which is arranged thereon and extends obliquely with respect to the closing direction X, runs up on an associated run-up inclination 410 on the latching portion 41 of the locking element 4 (FIGS. 3A, 3B). This causes the locking element 4 to be pivoted (slightly) about the joint axis 32 in an opening direction O (FIGS. 4A, 4B), such that the latching portion 21 of the first closure part 2 is able to be moved past the latching portion 41 of the locking element 4 of the second closure part 3.

In the case of said deflecting movement of the locking element 4, the sealing element 503 is moved with clearance in the chamber 512 of the housing element 41 of the delaying system 5 and is consequently able to move (at least almost) unobstructedly in the housing element 51 (FIG. 4C).

In the closed position (FIGS. 5A, 5B), the latching portion 21 abuts against a stop 35 of the housing 30 of the second closure part 3 and additionally engages the recess 42 of the locking element 4. In addition, the latching portion 41 of the locking element 4 engages the recess 22 of the first closure part 2. The first closure part 2 is consequently locked with the second closure part 3 in a positive locking manner by means of the locking element 4 and is held, in particular, on the second closure part 3 in opposition to the closing direction X. In said closed position, the locking element is situated once again in its first position corresponding to the starting position, into which it is snapped back on account of the preloaded spring action of the spring element 46.

To open the closure device 1, the locking element 4 can be pivoted in the opening direction O about the joint axis 32 in order to move, in this manner, the latching portion 41 of the locking element 4 and the latching element 21 of the first closure part 2 out of engagement with one another (FIGS. 6A, 6B). The locking element 4 comprises a handle 43 which projects out of the housing 30 and is able to be gripped by a user in order to actuate the locking element 4 in this manner. If the locking between the locking element 4 and the first closure part 2 has been released, the first closure part 2 can be removed out of the engagement opening 31 of the housing 30 of the second closure part 3 in opposition to the closing direction X (see FIGS. 7A, 7B).

When the locking element 4 is actuated for opening the closure device 1, the piston element 50 of the delaying system 5 is inserted into the housing element 51 with its shaft 501 in such a manner that a head 504 of the shaft 501 is moved closer to a bottom 514 of a second chamber 513 of the housing element 51 which connects axially to the first chamber 512. The sealing element 503 on the shaft 501 moves, in this connection, to abut against the inside wall of the cylindrical second chamber 513 and provides a sealing transition between the shaft 501 and the inside wall of the chamber 513.

As can be seen from FIGS. 6A and 6C, the sealing element 503 is situated, when the shaft 501 is inserted into the housing element 51, in a first, top position on the recess 502. The sealing element 503, when the shaft 501 is inserted in an insertion direction E into the housing element 51, is pressed into said first position on account of the frictional interaction with the inside wall of the chamber 513. In said first position, the sealing element 503 releases a through-flow opening 505 such that a fluid, in this case air, is able to flow out of a space R formed between the shaft 501 and the second chamber 513 of the housing element 51 and consequently the shaft 501 is able to be inserted in the insertion direction E into the chamber 513 without any great resistance.

In the second position of the locking element 4 according to FIGS. 6A, 6B corresponding to the unlocked position, the head 504 of the shaft 501 is moved closer to the bottom 514 of the chamber 513 and the space R enclosed by the shaft 501 and the inside wall of the chamber 513 is consequently small.

If, after removing the first closure part 2 and after termination of the actuation of the locking element 4, the locking element 4 is reset in opposition to the opening direction O into its first position corresponding to the starting position on account of the preloaded spring action of the spring element 46, this must be effected in opposition to the braking, delaying action of the delaying system 5. When the locking element 4 is reset, the shaft 501 of the piston element 50 is pulled out of the housing element 51, first of all, as can be seen from FIGS. 7A and 7C, the sealing element 503 being displaced into a second, bottom position in the recess 502. As a result, the flow-through opening 505 is made ineffective. For it no longer provides a flow-through between the space R and the surrounding area. The shaft 501 moves (further) out of the chamber 513, consequently, in opposition to a negative pressure force, which is generated in the space R on account of the increase in the size of the space R and which is only able to be reduced slowly by air flowing into the space R past the sealing element 503 or by a (small) opening in the housing wall, such that the resetting of the locking element 4, brought about by the spring element 46, is braked overall.

The resetting of the locking element 4 out of the second position (FIG. 6A) into the first position (FIG. 2A) corresponding to the starting position is consequently delayed. The first position is not reached until a predetermined delay time, which is fixed by the delaying system 5, has elapsed. The closure device 1 cannot be locked again until said delay time has elapsed.

This results, in particular, in the first closure part 2, once the closure device 1 has been unlocked, initially being able to remain in the second closure part 3 without locking being immediately reinstated. This makes it possible where several such closure devices 1 are used, to unlock the closure devices 1 one after another without the individual closure devices 1 having to be held manually in their unlocked position.

The closure device 1 according to the exemplary embodiment according to FIGS. 1A, 1B to 7A-7C is constituted as a mechanical closure device where the fitting of the first closure part 2 onto the second closure part 3 is to occur by hand and the first closure part 2 is to be pressed, in particular by hand, into engagement with the locking element 4 of the second closure part 3.

In the case of another exemplary embodiment shown in FIGS. 8A, 8B to 14A-14C, the fitting of the first closure part 2 onto the second closure part 3 in the closing direction X is magnetically supported, in contrast, by using magnetic elements 23, 63, on the one side, on the first closure part 2 and, on the other side, on the second closure part 3, such that when the first closure part 2 is fitted onto the engagement opening 31 of the housing 30 of the second closure part 3, the mechanical latching is able to be produced largely in a magnetically supported manner.

A magnetic element 23 is arranged on the latching portion 21 of the first closure part 2 to this end. In contrast, a magnetic holding device 6, which bears a magnetic element 63 on a head 62, is arranged—instead of the stop 35—on the housing 30 of the second closure part 3 so as to be pivotable about a joint axis 36.

The magnetic elements 23, 63 can be produced, for example, as permanent magnets or on the one side as a permanent magnet and on the other side as a magnetic fitting in the form of a component produced from a ferromagnetic material.

If the magnetic elements 23, 63 are developed as permanent magnets, they point, when the first closure part 2 is fitted onto the second closure part 3, to one another with opposite poles such that a magnetic attraction is brought about between the magnetic elements 23, 63.

The magnetic holding device 6 is pivotally mounted on the housing 30 of the second closure part 3 by means of the joint axis 36. A hook 61, which interacts with a hook 47 of the locking element which protrudes from the web 45 of the locking element 4, protrudes from the body 60 in the direction 30 of the second closure 3.

Prior to closing the closure device 1 (FIGS. 9A, 9B), the magnetic holding device 6 is held in an idle position as a result of the hook 61 abutting against the hook 47 of the locking element 4. The idle position of the magnetic holding device 6 is defined by the stop 33 against which the body 60 abuts in the idle position.

If the first closure part 2 is inserted with its locking portion 21 into the engagement opening 31, the magnetic element 23 arranged on the latching portion 21 is moved closer to the magnetic element 63 on the head 62 of the magnetic holding device 6, the magnetic attraction between the magnetic elements 23, 62 becoming stronger the closer the magnetic elements 23, 63 are together (see FIGS. 10, 10B and FIGS. 11A-11C).

In the closed position, the latching portion 21 abuts against the head 62 of the magnetic holding device 6 which consequently functions as a stop. The first closure part 2 is locked with the second closure part 3 by means of the locking element 4 (FIGS. 12A, 12B).

When the closure device 1 is opened by actuating the locking element 4, the hook 47 of the locking element 4 moves into abutment with the head 60 of the magnetic holding device 6 and adjusts the same, consequently, out of its idle position (FIGS. 13A-13C). As a result, the magnetic element 63 on the head 62 of the magnetic holding device 6 is moved tangentially—transversely with respect to the closing direction X—with respect to the magnetic element 23 on the latching portion 21 of the first closure part 2, such that the magnetic attraction between the magnetic elements 23, 63 is considerably reduced or even eliminated or reversed. Because additionally the locking between the locking element 4 and the first closure part 2 is eliminated, the first closure part 2 is able to be removed from the second closure part 3 in opposition to the closing direction X (FIGS. 14A-14C).

When resetting the locking element 4 into its first position corresponding to the starting position (FIGS. 14A-14C), the magnetic holding device 6 is also returned once again into its idle position by means of the hook 47 and the hook 61, such that the magnetic holding device 6 is situated in its idle position when the locking element 4 has also reached its first position.

Otherwise, as regards the individual components and the method of operation—in particular also as regards the delaying system 5—the exemplary embodiment according to FIGS. 8A, 8B to FIGS. 14A-14C is identical to the exemplary embodiment according to FIGS. 1A, 1B to FIGS. 7A-7C, such that reference should be made to the preceding explanations.

FIGS. 15A, 15B to 20A-20C once again show another exemplary embodiment of a closure device 1. In the case of said exemplary embodiment, the closure device 1 comprises a first closure part 7 which can be fitted onto a second closure part 8 in a closing direction X. The second closure part 8 comprises a housing 80 with an engagement opening 800 formed therein, into which the first closure part 7 with a latching portion 70 in the form of a locking head is able to be inserted in order to lock with a locking element 82 guided so as to be displaceable in the housing 80.

The locking element 82 is arranged in an interior 801 of the housing 80 so as to be displaceable in a rectilinear manner along an opening direction O. The housing 80 is closed by means of a housing cover 81 such that the locking element 82 is surrounded in the housing 80 and is guided on guide webs 811 of the cover 81 by means of guide webs 825.

An actuating element 84 in the form of an actuating button is guided on the housing 80 and the housing cover 81 so as to be displaceable along an actuating direction B. For this purpose, a guide element 85 is fitted on the housing cover 81 and is fixedly connected to the housing cover 81. The actuating element 84 is guided by means of guide webs 841 in guide grooves 851 of the guide element 85 and in guide grooves 802 which are aligned with the guide grooves 851 of the guide element 85 in the housing 80, such that the actuating element 84 is able to be adjusted in the actuating direction B relative to the housing 80.

The actuating element 84 passes through an opening 810 of the housing cover 81.

The actuating element 84 comprises, on its side facing the locking element 82, a slanting surface 42 which is formed by the wall edges and interacts with slanting surfaces 823 on the locking element 82 for moving the locking element 84 in the opening direction O, as will be described again below.

A preload element 83 is displaceably guided by means of guide grooves 830 in a recess 840 of the actuating element 84 along guide webs 843 which extend along the actuating direction B. The preload element 83 is preloaded in relation to the actuating element 84 by means of a spring element 87 developed as a compression spring.

The preload element 83 bears a magnetic element 831 in the form of a permanent magnet which interacts with magnetic elements 821, 822 on a housing portion 820 of the locking element 82. The magnetic element 883, in this connection, faces the magnetic element 821 of the housing portion 820 of the locking element 82 with an opposite pole, whilst the magnetic elements 831, 822 point to one another with identical poles.

A further magnetic element 827, which interacts with a magnetic element 71 of the first closure part 7 for supporting the closing of the closure device 1, is fitted on a housing portion 824 which connects along the opening direction O to the housing portion 820.

A locking device in the form of a spring locking element 86 with resiliently springy spring arms 860, which are arranged in a C-shaped manner with respect to one another and between them form an opening 861 in such a manner that the spring locking element 86 is open in opposition to the opening direction O, is additionally arranged on the housing portion 824. The locking head 70 of the first closure part 7 is able to engage in the spring locking element 86 in a locking manner such that, in a locked position, the first closure part 7 is held in opposition to the closing direction X in a positive locking manner on the spring locking element 86 by the spring arms 860 embracing the locking head 70 extensively at least in portions and engaging with suitable latching portions in a positive locking manner with the locking head 70.

Figure 15B:
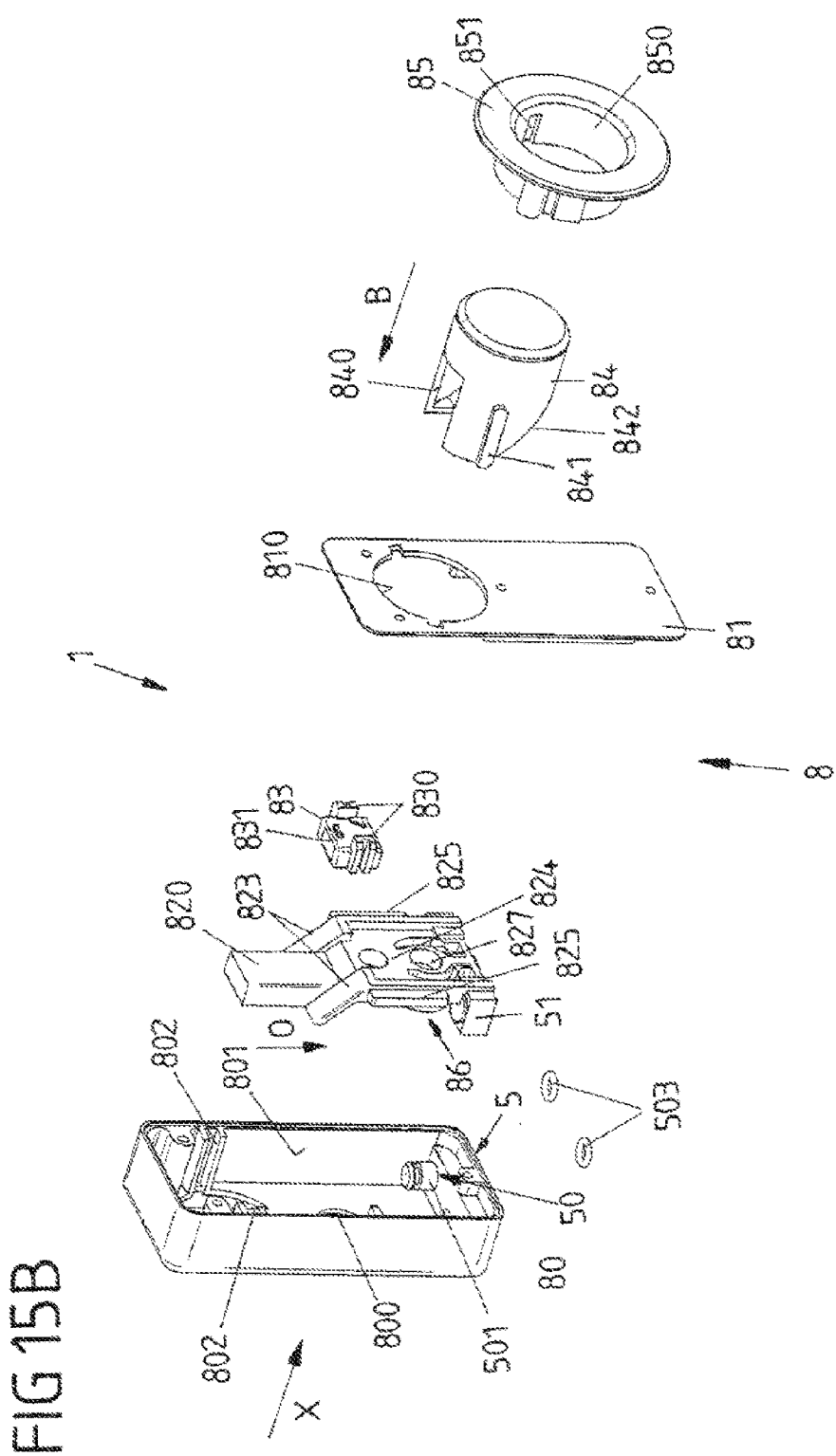

In the case of the exemplary embodiment according to FIGS. 15A, 15B, a delaying system 5 is constituted by two housing elements 51 on the locking element 82 and by piston elements 50 on an inside wall of the housing 80. The method of operation of the delaying system 5 is similar to that described beforehand for the first two exemplary embodiments and is to be explained again below.

For closing the closure device 1, the first closure part is inserted in the closing direction X into the engagement opening 800 on the bottom of the housing 80 and moves in this way into engagement with the spring locking element 86 of the locking element 82. To close the closure device 1, the locking element 82, in this connection, is situated in the position shown in FIG. 16B in which the spring locking element 86 is arranged behind the engagement opening 800 when viewed in the closing direction X.

During the fitting procedure, the locking head 70 of the first closure part 7 slides along a guide portion 803 which connects to the engagement opening 800 and extends into the interior 801 of the housing 80 (see FIG. 16B). The guide portion 803 additionally serves as a stop for defining the first position which the locking element 82 assumes for closing the closure device 1.

When fitting the first closure part 7 with the locking head 70 onto the spring locking element 86, the spring arms 860 deflect in a direction transversely with respect to the closing direction X and transversely with respect to the opening direction O such that the locking head 70 with its latching portions arranged therein can be moved past the latching portions of the spring arms 860 until the spring arms 860 snap in a positive locking manner into engagement with the locking head 70 and consequently locking is produced between the first closure part 7 and the locking element 82 of the second closure part 8.

The closing of the closure device 1 is magnetically supported by the magnetic elements 71, 827 on the first closure part 2 on the one side and the locking element 82 on the other side, which face one another in a magnetically attracting manner and consequently bring about a magnetic attraction onto the first closure part 7 in the closing direction X.

During closing, the actuating element 84 is situated in the position shown in FIG. 16B. In said position, the actuating element 84 is held by the preload element 83 and the spring element 87 which preloads the preload element 83 in relation to the actuating element 84. The preload element 83 abuts against the housing portion 820 of the locking element 82 in said position and is held in said position as a result of magnetic attraction between the magnetic elements 821, 831.

During closing, the piston elements 50 of the delaying system 5 are not in engagement with the housing elements 51. The delaying system 5 consequently has no effect in the closed position.

If the first closure part 7 is situated in engagement with the locking element 82 of the second closure part 8 and if the closure device 1 is to be opened to release the first closure part 7 from the second closure part 8, the actuating element 84, as shown in FIG. 17B, is adjusted in the actuating direction B—in opposition to the preloaded action of the spring element 87—and to this end is pressed into the guide element 85. In this case, the slanting surfaces 842 on the actuating element 84 bear on the slanting surfaces 823 on the locking element 82 such that on account of the oblique alignment of the slanting surfaces 823, 842, the locking element 82 is adjusted in the opening direction O inside the housing 80, as is shown in FIG. 17B.

As a result, the first closure part 7 with its locking head 70 is moved out of engagement with the spring locking element 86 by the spring locking element 86 together with the locking element 82 being displaced in the opening direction O out of engagement with the locking head 70. The first closure part 7, in this connection, remains in position in the engagement opening 800 of the housing 80 and moves out of engagement with the spring locking element 66 through the opening 861 between the spring arms 860.

As a result of displacing the locking element 82, the magnetic element 827 is additionally displaced in the opening direction O relative to the magnetic element 71 on the first closure part 7 such that the magnetic attraction between the magnetic elements 71, 827 is at least weakened if not completely eliminated or is reversed. As a result, the first closure part 7 is able to be removed from the second closure part 8 in opposition to the closing direction X in a simple manner.

As a result of displacing the locking element 82 in the opening direction O, the housing portion 820 is additionally displaced with the magnetic elements 821, 822 arranged therein in the opening direction O relative to the preload element 83 with the magnetic element 831 arranged thereon (see FIG. 17B). In the unlocked, second position of the locking element 82, the magnetic element 8310 of the preload element 83 consequently faces the magnetic element 822 on the housing portion 820 in a magnetically repelling manner such that the preload element 83 and consequently also the actuating element 84 is reset in opposition to the actuating direction B. On account of the preloaded effect of the spring element 87, the actuating element 84 is additionally (once again) removed from the preload element 83 such that the position shown in FIG. 18B is produced in which the actuating element 84 has evidently emerged out of the guide element 85.

Resetting the locking element 82 out of the unlocked, second position into the first position corresponding to the starting position is possible as a result of the actuating element 84. To this end, the locking element 82 is, for example, preloaded in relation to the housing 80 in a resilient manner by means of a suitable spring element (not shown) such that the spring element brings about a resetting force in opposition to the opening direction O for resetting the locking element 82 from the unlocked second position into the first position.

When unlocking the locking element 82, the housing elements 51 on the locking element 82 move in engagement with the piston elements 50 on the housing 80, as is shown in FIGS. 17A and 18A. Sealing elements in form of sealing rings 503 are arranged, in this connection, on a shaft 501 of the piston elements 50 such that the shafts 501 of the piston elements 50 are inserted in a sealing manner in the associated housing elements 51 and in each case, together with the associated housing element 51, enclose a space R, the volume of which is small in the unlocked second position of the locking element 82.

If the locking element 82, on account of the preload action of the resetting spring element in opposition to the opening direction O, is reset out of the unlocked second position, this must be effected against the action of the delaying system 5. The resetting movement, in this connection, is braked by a negative pressure force which is generated in the spaces R of the housing elements 51 and can only be reduced in a delayed manner by air flowing into the spaces R. The resetting of the locking element 82 into the first position corresponding to the starting position (FIG. 19B) is effected consequently in a time-delayed manner such that the closure device 1 cannot be locked until a predetermined delay time has elapsed.

If the locking element, as shown in FIG. 19B, has reached its first position, the magnetic element 821 on the housing portion 820 of the locking element 82 once again faces the magnetic element 831 on the preload element 83 in a magnetically attracting manner such that the preload element 83, and together with the preload element 83 the actuating element 84 coupled with the preload element 83 by means of the spring element 87, is pulled in the actuating direction B toward the locking element 82, as is shown in FIG. 20B. Consequently, the starting position, in which the closing device 1 is able to be locked again, is reached by the first closure part 7 being fitted onto the engagement opening 800 of the second closure part 8.

The actuating element 84 protruding out of the guide element 85 (see FIG. 19B) also serves for the purpose of indicating that the locking element 82 has not (yet) been reset into its first position and locking of the closure device 1 is consequently not (yet) possible or has not (yet) been effected. The highlighted actuating element 84 consequently also serves as an indicator for a state by locking being possible or having being correctly carried out.

Because the resetting of the locking element 82 is effected in a delayed manner and is not concluded until a predetermined delay time—which is determined as a result of dimensioning the delaying system 5—has elapsed, it is possible, when using several closure devices 1 in combination, to open the closure devices 1 one after another, which is easily possible with one hand. Because once a closure device 1 has been opened, it remains in its open position (initially), further closure devices 1 can be opened one after another in order then to separate the objects coupled by means of the closure devices 1 from one another.

The concept underlying the invention is not limited to the previously depicted exemplary embodiments, but can also be realized, in principle, with completely different types of embodiments.

In principle, a closure device of the type described here can be developed with or without magnetic elements supporting the function. Magnetic elements which support the closing of the closure device in a magnetic manner can certainly be advantageous but are not absolutely necessary.

The closure device can comprise a completely different type of design to that described above. In particular, closure devices as described in WO 2008/006357 A2, WO 2008/006354 A2, WO 2009/092368 A2, WO 2010/006594 A2, WO 2008/006356 A2, WO 2009/010049 S2, WO 2009/127196 A2, WO 2014/090926 A1 and international application PCT/EP 2013/060762 can be used.

The use of such closure devices is possible in a varied manner. In principle, closure devices of the type described here can be used for the releasable connection of two arbitrary objects.

LIST OF REFERENCES

1 Closure device
2 Closure part
20 Body
21 Latching lug
210 Run-up inclination
22 Recess
23 Magnetic element
3 Closure part
30 Housing
31 Engagement opening
310, 311 Guide portion
32 Joint axis
33 Stop
34 Joint axis
35 Stop
36 Joint axis
4 Locking element
40 Body
41 Latching lug
410 Run-up inclination
42 Recess
43 Handle end
44 Joint axis
45 Web
450 Hinge point
46 Spring element
460 Turn
461, 462 Spring leg
47 Projection
5 Delaying system
50 Piston element
500 Hinge point
501 Shaft
502 Recess
503 Sealing element
504 Head
505 Through-flow opening
51 Housing element
510 Opening
511 Hinge point
512, 513 Chamber
514 Bottom
6 Magnetic holding device
60 Body
61 Hook
62 Head
63 Magnetic element
7 Closure part
70 Locking head
8 Closure part
80 Housing
800 Engagement opening
801 Interior
802 Guide groove
803 Guide portion
81 Housing cover
810 Opening
811 Guide web
82 Locking element
820 Housing portion
821, 822 Magnetic element
823 Slanting surface
824 Housing portion
825 Guide webs
827 Magnetic element
83 Preload element
830 Guide groove
831 Magnetic element
84 Actuating element
840 Recess
841 Guide web
842 Slanting surface
843 Guide web
85 Guide element
850 Opening
851 Guide groove
86 Spring locking element
860 Spring arm
861 Opening
87 Spring element
A Detail
B Actuating direction
E Insertion direction
O Opening direction
P Pivoting direction
R Space
X Closing direction

The invention claimed is:
1. A hand-actuated closing device, comprising two closing parts which are fittable together along a closing direction, are mechanically interconnected in a closed position and are releasable from one another as by releasing the mechanical connection, wherein one of the closure parts comprises a housing and a locking element which is arranged so as to be movable on the housing and is in connection with the other closure part in the closed position to produce the mechanical connection between the closure parts, wherein in the closed position, the locking part assumes a first position on the housing, is manually movable from the first position into a second position to release the closure parts and is resettable from the second position into the first position under the action of a resetting force, and comprising a delaying system which is constituted to delay the resetting of the locking element from the second position into the first position under the effect of a resetting force in such a manner that the locking element moves back into the first position only after lapse of a predetermined delay time has elapsed.

2. The closure device as claimed in claim 1, wherein the delaying system is constituted in such a manner that the locking element is automatically reset into the first position after being moved out of the first position and reaches the first position only after lapse of a predetermined delay time.

3. The closure device as claimed in claim 1, wherein the delaying system operates in a pneumatic, hydraulic, electric or electro-magnetic manner.

4. The closure device as claimed in claim 1, wherein the delaying system comprises a first component and a second component which are adjustable relative to one another and together enclose a space at least in the second position of the locking element.

5. The closure device as claimed in claim 4, wherein the space increases in size when the locking element is reset out of the second position in the direction of the first position such that a negative pressure force is brought about to delay the resetting movement.

6. The closure device as claimed in claim 1, wherein the closure parts comprise in each case at least one magnetic element, wherein the magnetic elements support the fitting of the closure parts in a magnetic manner for closing the closure device.

7. The closure device as claimed in claim 6, wherein to support the closing of the closure device, a magnetic element is arranged on the locking element or on a component that is entrained when the locking element is moved.

8. The closure device as claimed in claim 1, further comprising a resetting device which acts between the housing and the locking element for providing a resetting force for resetting the locking element out of the second position in the direction of the first position.

9. The closure device as claimed in claim 1, wherein the housing comprises an engagement opening, into which the other of the closure parts is insertable with a latching portion, and at least one guide portion which extends along the closing direction and connects to the engagement opening for guiding the latching portion of the other of the closure parts into the closed position.

10. The closure device as claimed in claim 1, wherein the locking element comprises a latching portion for locking in a latching manner with the other of the closure parts.

11. The closure device as claimed in claim 1, wherein the locking element is mounted so as to be pivotable on the housing.

12. The closure device as claimed in claim 11, wherein the locking element is pivotable relative to the housing about an axis that is directed transversely with respect to the closing direction or about an axis that is directed parallel to the closing direction.

13. The closure device as claimed in claim 1, wherein the locking element is arranged so as to be displaceable on the housing.

14. The closure device as claimed in claim 1, further comprising an actuating element which is arranged on the housing so as to be adjustable along an actuating direction and is constituted to act on the locking element during actuation for moving the locking element out of the first position.

15. The closure device as claimed in claim 14, wherein the actuating element is guided on the housing so as to be displaceable in a rectilinear manner.

16. The closure device as claimed in claim 14, wherein the actuating element comprises a slanting surface which is directed at an angle to the actuating direction and is constituted to run up onto an associated slanting surface of the locking element when the actuating element is actuated and as a result adjust the locking element out of the first position.

17. The closure device as claimed in claim 14, further comprising a preload element which is guided along the actuating direction so as to be adjustable and is preloaded in a resilient manner in relation to the actuating element.

18. The closure device as claimed in claim 17, wherein the preload element comprises a first magnetic element which, in the first position of the locking element, faces a second magnetic element of the locking element in a magnetically attracting manner.

19. The closure device as claimed in claim 18, wherein the first magnetic element of the preload element in the second position of the locking element faces a third magnetic element of the locking element in a magnetically repelling manner.

20. The closure device as claimed in claim 19, wherein the actuating element is adjustable out of the starting position in the actuating direction for adjusting the locking element out of the first position into the second position, wherein on account of the magnetically repelling interaction between the first magnetic element of the preload element and the third magnetic element of the locking element, the actuating element, after the adjusting of the locking element into the second position, is adjusted beyond the starting position in opposition to the actuating direction and after a time-delayed resetting of the locking element into the first position is moved once again into the starting position.

\* \* \* \* \*